United States Patent
Nakagami et al.

(10) Patent No.: US 11,429,909 B2
(45) Date of Patent: Aug. 30, 2022

(54) INFORMATION-TECHNOLOGY UTILIZATION EVALUATION DEVICE AND INFORMATION-TECHNOLOGY UTILIZATION EVALUATION METHOD

(71) Applicant: Mitsubishi Electric Corporation, Tokyo (JP)

(72) Inventors: Toshiaki Nakagami, Tokyo (JP); Hiroyoshi Kishimoto, Tokyo (JP); Mitsuyasu Matsuo, Tokyo (JP); Takeshi Kurosaki, Tokyo (JP); Takaaki Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 430 days.

(21) Appl. No.: 16/485,795

(22) PCT Filed: Mar. 3, 2017

(86) PCT No.: PCT/JP2017/008534
§ 371 (c)(1),
(2) Date: Aug. 14, 2019

(87) PCT Pub. No.: WO2018/158941
PCT Pub. Date: Sep. 7, 2018

(65) Prior Publication Data
US 2020/0050989 A1    Feb. 13, 2020

(51) Int. Cl.
*G06Q 10/00* (2012.01)
*G06Q 10/06* (2012.01)
*G06F 9/50* (2006.01)

(52) U.S. Cl.
CPC ..... *G06Q 10/06312* (2013.01); *G06F 9/5027* (2013.01); *G06Q 10/0639* (2013.01)

(58) Field of Classification Search
None
See application file for complete search history.

(56) References Cited

U.S. PATENT DOCUMENTS 8,775,591 B2 * 7/2014 Bobak ............... H04L 41/0654
709/224
8,786,399 B2 * 7/2014 Skourup ............ G05B 23/0267
359/9
(Continued)

FOREIGN PATENT DOCUMENTS

JP    2002-352060 A    12/2002
JP    2003-150231 A    5/2003
(Continued)

OTHER PUBLICATIONS

Zur Muehlen, Michael, and Michael Rosemann. "Workflow-based process monitoring and controlling-technical and organizational issues." Proceedings of the 33rd Annual Hawaii International Conference on System Sciences. IEEE, 2000. (Year: 2000).*
(Continued)

*Primary Examiner* — Gurkanwaljit Singh
(74) *Attorney, Agent, or Firm* — Xsensus LLP

(57) ABSTRACT

An information-technology utilization evaluation device includes a first determination unit to determine an attainment level of a first evaluation element in an evaluation-target management target process including a set of unit processes. The first evaluation element represents a degree of automation achieved by utilizing information technology. The information-technology utilization evaluation device includes a second determination unit to determine an attainment level of a second evaluation element in the management target process. The second evaluation element represents a scale of a set of unit processes utilizing the information technology.

21 Claims, 21 Drawing Sheets

(56) References Cited

U.S. PATENT DOCUMENTS

| | | | |
|---|---|---|---|
| 10,525,984 B2* | 1/2020 | Seppelt | G06Q 40/08 |
| 10,733,562 B2* | 8/2020 | Binder | G06Q 10/067 |
| 2004/0103165 A1* | 5/2004 | Nixon | H04W 72/02 |
| | | | 709/217 |
| 2006/0190583 A1* | 8/2006 | Whalen | H04L 41/085 |
| | | | 714/E11.207 |
| 2006/0242261 A1 | 10/2006 | Piot et al. | |
| 2007/0192236 A1* | 8/2007 | Futch | G06Q 40/025 |
| | | | 705/38 |
| 2009/0171703 A1* | 7/2009 | Bobak | G06Q 10/06 |
| | | | 705/7.15 |
| 2009/0171707 A1* | 7/2009 | Bobak | G06Q 10/06 |
| | | | 705/7.23 |
| 2009/0171708 A1* | 7/2009 | Bobak | G06Q 10/06 |
| | | | 705/348 |
| 2009/0172149 A1* | 7/2009 | Bobak | H04L 41/0654 |
| | | | 709/224 |
| 2009/0172769 A1* | 7/2009 | Bobak | H04L 41/5003 |
| | | | 726/1 |
| 2010/0207719 A1* | 8/2010 | Skourup | G05B 23/0267 |
| | | | 340/3.7 |
| 2011/0166835 A1* | 7/2011 | Devarakonda | H04L 41/142 |
| | | | 703/2 |
| 2012/0102075 A1* | 4/2012 | Breh | G06F 9/44505 |
| | | | 707/812 |

FOREIGN PATENT DOCUMENTS

| | | | |
|---|---|---|---|
| JP | 2004-102326 A | 4/2004 | |
| JP | 2005-234638 A | 9/2005 | |
| JP | 2007-72715 A | 3/2007 | |
| JP | 2009-251993 A | 10/2009 | |
| WO | 2006/116048 A2 | 11/2006 | |

OTHER PUBLICATIONS

Taylor, Shirley, and Peter A. Todd. "Understanding information technology usage: A test of competing models." Information systems research 6.2 (1995): 144-176. (Year: 1995).*

Boudreau, Marie-Claude, and Daniel Robey. "Enacting integrated information technology: A human agency perspective." Organization science 16.1 (2005): 3-18. (Year: 2005).*

Trkman, Peter. "The critical success factors of business process management." International journal of information management 30.2 (2010): 125-134. (Year: 2010).*

Cohen, Guy, et al. "A linear-system-theoretic view of discrete-event processes and its use for performance evaluation in manufacturing." IEEE transactions on Automatic Control 30.3 (1985): 210-220. (Year: 1985).*

Leitão, Paulo, Armando Walter Colombo, and Stamatis Karnouskos. "Industrial automation based on cyber-physical systems technologies: Prototype implementations and challenges." Computers in industry 81 (2016): 11-25. (Year: 2016).*

Van Nieuwenhuyse, Inneke, et al. "Advanced resource planning as a decision support module for ERP." Computers in Industry 62.1 (2011): 1-8. (Year: 2011).*

International Search Report and Written Opinion dated May 16, 2017 for PCT/JP2017/008534 filed on Mar. 3, 2017, 7 pages including English Translation of the International Search Report.

Notice of reasons for Refusal received for Japanese Patent Application No. 2018-565898, dated Mar. 26, 2019, 8 pages including English Translation.

* cited by examiner

FIG.8

| SHOP NAME/SHOP A | | | | | |
|---|---|---|---|---|---|
| LINE NAME/LA1 | | | | | |
| MANAGEMENT FUNCTION | No. | ITEM | AUTOMATION LEVEL | NUMBER OF TARGETS | NUMBER OF APPLICABLE PROCESSES |
| FACILITY OPERATION MANAGEMENT | 1 | IS MACHINING START TIME FOR EACH WORKPIECE COMPUTERIZED? | 1 | | |
| | 2 | IS FACILITY OPERATION START TIME COMPUTERIZED? | 1 | | |
| | ... | ... | ... | | |
| | 6 | IS CYCLE TIME VISUALIZED? | 2 | | |
| | ... | ... | ... | | |
| | 11 | ......... | 3 | | |
| | ... | ... | ... | | |
| | 16 | ......... | 4 | | |
| | ... | ... | ... | | |
| QUALITY MANAGEMENT | 21 | ......... | 1 | | |
| | 22 | ......... | 1 | | |
| | 23 | ......... | 2 | | |
| | 24 | ......... | 4 | | |
| | ... | ... | ... | | |

| MANAGEMENT FUNCTION | No. | ITEM | AUTOMATION LEVEL | NUMBER OF APPLICABLE PROCESSES/NUMBER OF TARGETS ||||||| 
| --- | --- | --- | --- | --- | --- | --- | --- | --- | --- | --- |
| | | | | SHOP A |||| SHOP B ||| |
| | | | | LA1 | LA2 | ... | | LB1 | LB2 | LB3 | ... |
| AA MANAGEMENT | AA1 | ... | 1 | 5/5 | 5/5 | | | 5/5 | 5/5 | 5/5 | ... |
| | AA2 | ... | 1 | 5/5 | 4/5 | | | 5/5 | 3/5 | 5/5 | |
| | AA3 | ... | 1 | 2/5 | 4/5 | | | 2/5 | 3/5 | 1/5 | |
| | AA4 | ... | 1 | 0/5 | 1/5 | | | 0/5 | 0/5 | 0/5 | |
| | AA5 | ... | 1 | 0/5 | 0/5 | | | 0/5 | 0/5 | 0/5 | |
| | ... | ... | ... | ... | ... | ... | | ... | ... | ... | ... |

FIG.10

| MANAGEMENT FUNCTION | No. | ITEM | AUTO-MATION LEVEL | NUMBER OF APPLICABLE PROCESSES/NUMBER OF TARGETS | | | | | | | | | SCALE LEVEL (X) |
|---|---|---|---|---|---|---|---|---|---|---|---|---|---|
| | | | | SHOP A | | | SHOP B | | | ... | DISTRIBUTION | | |
| | | | | LA1 | LA2 | ... | LB1 | LB2 | LB3 | ... | LLO1 | LLO2 | |
| BB MANAGEMENT | BB1 | ... | 1 | 0/5 | 0/5 | ... | 0/5 | 0/5 | 0/5 | ... | 0/1 | 0/1 | 0 |
| | BB2 | ... | 1 | 1/5 | 0/5 | ... | 0/5 | 0/5 | 0/5 | ... | 0/1 | 0/1 | 1 |
| | BB3 | ... | 1 | 1/5 | 1/5 | ... | 0/5 | 0/5 | 0/5 | ... | 0/1 | 0/1 | $1<X<2$ |
| | BB4 | ... | 1 | 2/5 | 1/5 | ... | 0/5 | 0/5 | 0/5 | ... | 0/1 | 0/1 | $1<X<2$ |
| | BB5 | ... | 1 | 5/5 | 0/5 | ... | 0/5 | 0/5 | 0/5 | ... | 0/1 | 0/1 | 2 |
| | BB6 | ... | 1 | 5/5 | 2/5 | ... | 1/5 | 2/5 | 3/5 | ... | 0/1 | 0/1 | $2<X<Z$ |
| | BB7 | ... | 1 | 5/5 | 5/5 | ... | 1/5 | 2/5 | 3/5 | ... | 0/1 | 0/1 | $2<X<Z$ |
| | BB8 | ... | 1 | 5/5 | 0/5 | ... | 5/5 | 0/5 | 0/5 | ... | 0/1 | 0/1 | Z |
| | BB9 | ... | 1 | 5/5 | 2/5 | ... | 5/5 | 1/5 | 3/5 | ... | 0/1 | 0/1 | $Z<X<3$ |
| | BB10 | ... | 1 | 5/5 | 5/5 | ... | 5/5 | 5/5 | 5/5 | ... | 0/1 | 0/1 | 3 |
| | BB11 | ... | 1 | 5/5 | 5/5 | ... | 5/5 | 5/5 | 5/5 | ... | 1/1 | 0/1 | $3<X<4$ |
| | BB12 | ... | 1 | 5/5 | 5/5 | ... | 5/5 | 5/5 | 5/5 | ... | 1/1 | 1/1 | 4 |

FIG.13

| MANAGEMENT FUNCTION | $X_1$ | $Y_1$ | $X_2$ | $Y_2$ | $X_3$ | $Y_3$ | $X_4$ | $Y_4$ |
|---|---|---|---|---|---|---|---|---|
| AA MANAGEMENT | 3.93 | 0.99 | 3.60 | 1.64 | 2.65 | 2.28 | 1.87 | 3.60 |
| BB MANAGEMENT | 2.81 | 0.11 | 2.28 | 1.04 | 1.54 | 2.93 | 1.30 | 3.37 |
| CC MANAGEMENT | 2.68 | 0.21 | 2.40 | 1.77 | 1.44 | 2.55 | 1.28 | 3.64 |
| DD MANAGEMENT | 1.91 | 0.84 | 1.49 | 1.50 | 0.88 | 2.05 | 0.59 | 3.75 |
| EE MANAGEMENT | 1.70 | 0.66 | 1.05 | 1.29 | 0.38 | 2.32 | 0.20 | 3.69 |

FIG.14

| MANAGEMENT FUNCTION | X | Y |
|---|---|---|
| AA MANAGEMENT | 3.01 | 2.51 |
| BB MANAGEMENT | 1.98 | 1.45 |
| CC MANAGEMENT | 1.95 | 2.17 |
| DD MANAGEMENT | 1.22 | 2.14 |
| EE MANAGEMENT | 0.83 | 1.96 |

FIG.15

| | SCALE LEVEL 1 (UNIT PROCESS) | SCALE LEVEL 2 (LINE) | SCALE LEVEL 3 (FACTORY) | SCALE LEVEL 4 (SUPPLY CHAIN) |
|---|---|---|---|---|
| AUTOMATION LEVEL 4 (IMPROVEMENT) | | | | |
| AUTOMATION LEVEL 3 (ANALYSIS) | | ☆ | | |
| AUTOMATION LEVEL 2 (VISUALIZATION) | | | | |
| AUTOMATION LEVEL 1 (DATA COLLECTION) | | | | |

FIG.16

| MANAGEMENT FUNCTION | WEIGHT COEFFICIENT | $X_1$ | $Y_1$ | $X_2$ | $Y_2$ | $X_3$ | $Y_3$ | $X_4$ | $Y_4$ |
|---|---|---|---|---|---|---|---|---|---|
| AA MANAGEMENT | 4 | 15.72 | 3.96 | 14.40 | 6.56 | 10.60 | 9.12 | 7.48 | 14.40 |
| BB MANAGEMENT | 1 | 2.81 | 0.11 | 2.28 | 1.04 | 1.54 | 2.93 | 1.30 | 3.37 |
| CC MANAGEMENT | 3 | 8.04 | 0.63 | 7.20 | 5.31 | 4.32 | 7.65 | 3.84 | 10.92 |
| DD MANAGEMENT | 2 | 3.82 | 1.68 | 2.98 | 3.00 | 1.76 | 4.10 | 1.18 | 7.50 |
| EE MANAGEMENT | 5 | 8.50 | 3.30 | 5.25 | 6.45 | 1.90 | 11.60 | 1.00 | 18.45 |
| OVERALL FUNCTION | | 2.59 | 0.65 | 2.14 | 1.49 | 1.34 | 2.36 | 0.99 | 3.64 |

| | 72A | 72B | 72C |
|---|---|---|---|
| PROCESS ID | KOUTEI-1 | KOUTEI-1 | KOUTEI-1 |
| TEST START TIME | 20XX/1/18 10:20:30 | 20XX/1/18 13:50:52 | 20XX/1/18 15:30:00 |
| TEST END TIME | 20XX/1/18 10:21:00 | 20XX/1/18 13:51:22 | 20XX/1/18 15:30:15 |
| DEVICE TYPE | TYPE-A | TYPE-A | TYPE-B |
| PRODUCT ID | AAA001 | AAA002 | AAA003 |
| PASS/FAIL DETERMINATION | PASSED | FAILED | NOT DETERMINED YET |
| FIRST MEASUREMENT VALUE | 5.1252 | 3.2537 | 4.5223 |
| SECOND MEASUREMENT VALUE | 12.42 | 13.23 | NONE |
| ... | ... | ... | ... |

| | 73A | 73B | 73C |
|---|---|---|---|
| PROCESS ID | KOUTEI-1 | KOUTEI-1 | KOUTEI-1 |
| TEST START TIME | 20XX/1/18 10:20:30 | 20XX/1/18 13:50:52 | 20XX/1/18 15:30:00 |
| TEST END TIME | 20XX/1/18 10:21:00 | 20XX/1/18 13:51:22 | 20XX/1/18 15:30:15 |
| DEVICE TYPE | TYPE-A | TYPE-A | TYPE-B |
| PRODUCT ID | AAA001 | AAA002 | AAA003 |
| PASS/FAIL DETERMINATION | PASSED | FAILED | NOT DETERMINED YET |
| FIRST MEASUREMENT VALUE | 5.1252 | 3.2537 | 4.5223 |
| SECOND MEASUREMENT VALUE | 12.42 | 13.23 | NONE |
| ... | ... | ... | ... |
| FIRST DISPLAY VALUE | 5.1 | 3.2 | 4.5 |
| SECOND DISPLAY VALUE | 12.4 | 13.2 | NONE |

FIG.22

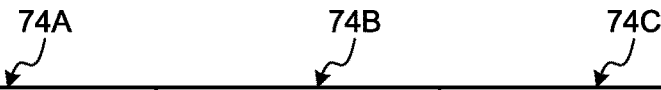

| | 74A | 74B | 74C |
|---|---|---|---|
| PROCESS ID | KOUTEI-1 | KOUTEI-1 | KOUTEI-1 |
| TEST START TIME | 20XX/1/18 10:20:30 | 20XX/1/18 13:50:52 | 20XX/1/18 15:30:00 |
| TEST END TIME | 20XX/1/18 10:21:00 | 20XX/1/18 13:51:22 | 20XX/1/18 15:30:15 |
| DEVICE TYPE | TYPE-A | TYPE-A | TYPE-B |
| PRODUCT ID | AAA001 | AAA002 | AAA003 |
| PASS/FAIL DETERMINATION | PASSED | FAILED | NOT DETERMINED YET |
| FIRST MEASUREMENT VALUE | 5.1252 | 3.2537 | 4.5223 |
| SECOND MEASUREMENT VALUE | 12.42 | 13.23 | NONE |
| ... | ... | ... | ... |
| FIRST DISPLAY VALUE | 5.1 | 3.2 | 4.5 |
| SECOND DISPLAY VALUE | 12.4 | 13.2 | NONE |
| AVERAGE OF MEASUREMENT VALUES | 8.7721 | 8.24185 | NONE |

FIG.23

| | 75A | 75B | 75C |
|---|---|---|---|
| PRODUCT ID | AAA001 | AAA002 | AAA003 |
| DETAILED INSTRUCTION | PERMIT SHIPMENT | DISCARD PRODUCT DUE TO FAULT | REINSPECT |

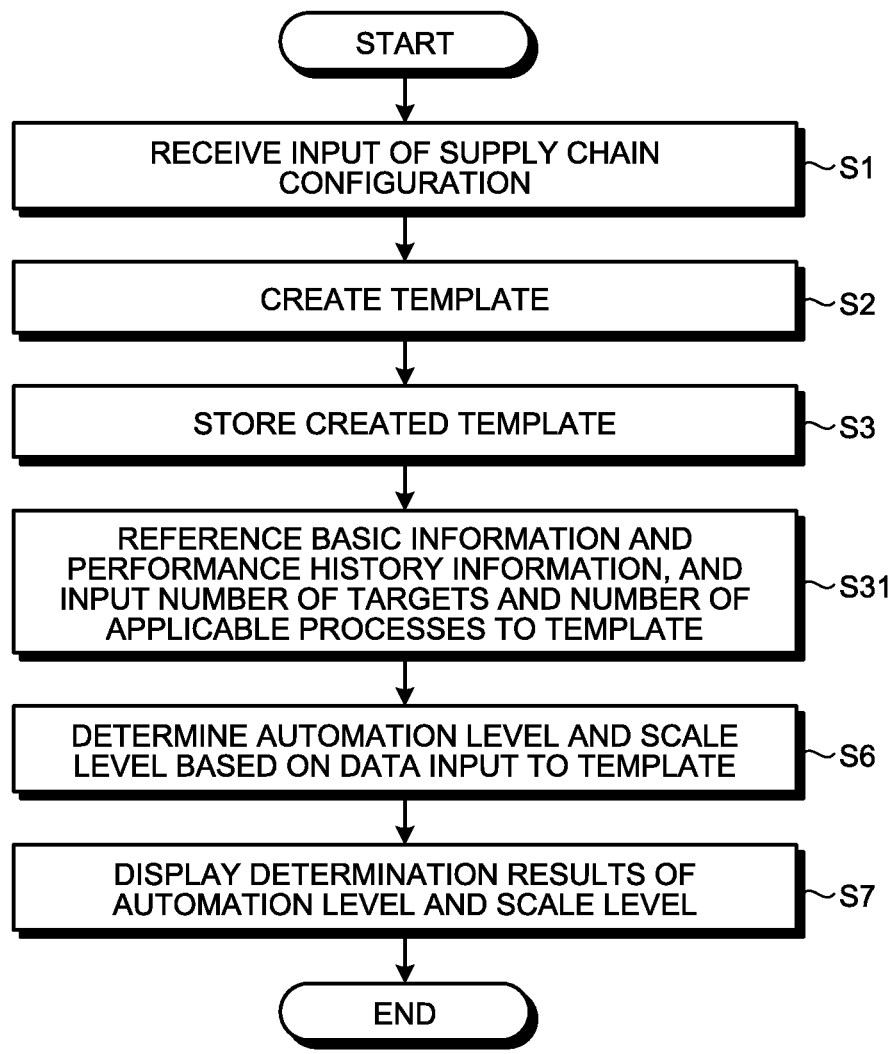

INFORMATION-TECHNOLOGY UTILIZATION EVALUATION DEVICE AND INFORMATION-TECHNOLOGY UTILIZATION EVALUATION METHOD

CROSS-REFERENCE TO RELATED APPLICATIONS

The present application is based on PCT filing PCT/JP2017/008534, filed Mar. 3, 2017, the entire contents of which are incorporated herein by reference.

FIELD

The present invention relates to an information-technology utilization evaluation device and an information-technology utilization evaluation method for evaluating the degree of utilization of information technology in management of a management target process that is a target to be evaluated.

BACKGROUND

In activities for product productivity improvements, Information Technology (IT)-driven production management is conducted in some cases. The productivity can be efficiently improved by promoting IT-driven automation in collecting information regarding the status of work processes, analyzing and diagnosing the collected information, and improving the work processes in accordance with the diagnostic results.

Patent Literature 1 discloses a technique of a productivity management apparatus that adds a contribution of IT-driven business innovation as one of the production management elements and that calculates a hypothetical expectation effect of the business innovation on the current productivity. The productivity management apparatus calculates a characteristic value indicating the current productivity and a characteristic value indicating the productivity goal on the basis of information input to a template and used for analyzing, diagnosing, and evaluating the productivity. In the productivity management apparatus, the template provided with given items is stored in advance. The productivity management apparatus automatically inputs information to each item of the template through the interface.

CITATION LIST

Patent Literature

Japanese Patent Application Laid-open No. 2009-251993

SUMMARY

Technical Problem

However, the productivity management apparatus described in Patent Literature 1 mentioned above calculates a contribution of IT utilization in the overall business by summing the evaluations of individual management items. Thus, this productivity management apparatus is not capable of evaluating into which areas of the production site IT has been introduced or how far IT has been introduced. Accordingly, in a case where IT is newly introduced into a specific production line at the production site or into other targets in order to improve their productivity, it is difficult to use the evaluation results, obtained by the productivity management apparatus described in Patent Literature 1 mentioned above, as an indicator for their improvement goal.

The present invention has been achieved to solve the above problems, and an object of the present invention is to provide an information-technology utilization evaluation device that is capable of making useful evaluations of the degree of information technology utilization.

Solution to Problem

In order to solve the above problems and achieve the object, an information-technology utilization evaluation device according to an aspect of the present invention includes a first determination unit to determine an attainment level of a first evaluation element representing a degree of automation achieved by utilizing information technology in an evaluation-target management target process including a set of unit processes. The information-technology utilization evaluation device according to an aspect of the present invention includes a second determination unit to determine an attainment level of a second evaluation element representing a scale of a set of unit processes utilizing the information technology in the management target process.

Advantageous Effects of Invention

The information-technology utilization evaluation device according to the present invention has an effect where it is possible to make useful evaluations of the degree of information technology utilization.

BRIEF DESCRIPTION OF DRAWINGS

FIG. 8 is a diagram illustrating an example of a template created by a template creation unit illustrated in FIG. 1.

FIG. 9 is an explanatory diagram of a determination of the attainment level in an automation determination unit illustrated in FIG. 1.

FIG. 10 is an explanatory diagram of a determination of the attainment level in a scale determination unit illustrated in FIG. 1.

FIG. 13 is a first diagram illustrating an example of determination results of the attainment level obtained by the automation determination unit and the attainment level obtained by the scale determination unit illustrated in FIG. 1.

FIG. 14 is a second diagram illustrating an example of determination results of the attainment level obtained by the automation determination unit and the attainment level obtained by the scale determination unit illustrated in FIG. 1.

FIG. 15 is a diagram illustrating an example of display of determination results obtained by the automation determination unit and the scale determination unit illustrated in FIG. 1.

FIG. 16 is a diagram illustrating a modification of determination results of the attainment level obtained by the automation determination unit and the attainment level obtained by the scale determination unit illustrated in FIG. 1.

FIG. 22 is a diagram illustrating an example of processed data that is performance history information in the performance history DB illustrated in FIG. 18.

FIG. 23 is a diagram illustrating an example of instruction data that is performance history information in the performance history DB illustrated in FIG. 18.

FIG. 24 is a flowchart illustrating an operational procedure for the IT utilization evaluation device according to the second embodiment.

DESCRIPTION OF EMBODIMENTS

An information-technology utilization evaluation device and an information-technology utilization evaluation method according to embodiments of the present invention will be described in detail below with reference to the accompanying drawings. The present invention is not limited to the embodiments.

First Embodiment

An information-technology (IT) utilization evaluation device according to a first embodiment of the present invention evaluates the degree of IT utilization in management of a management target process that is a target to be evaluated. An example of the management target process that is a target to be evaluated is a supply chain including manufacturing processes in the manufacturing industry. In the supply chain, process management is conducted so as to make it possible to efficiently produce products. The IT utilization evaluation device according to the first embodiment is a device that evaluates the degree of IT utilization in process management in the overall supply chain that is a target to be evaluated.

Figure 1:
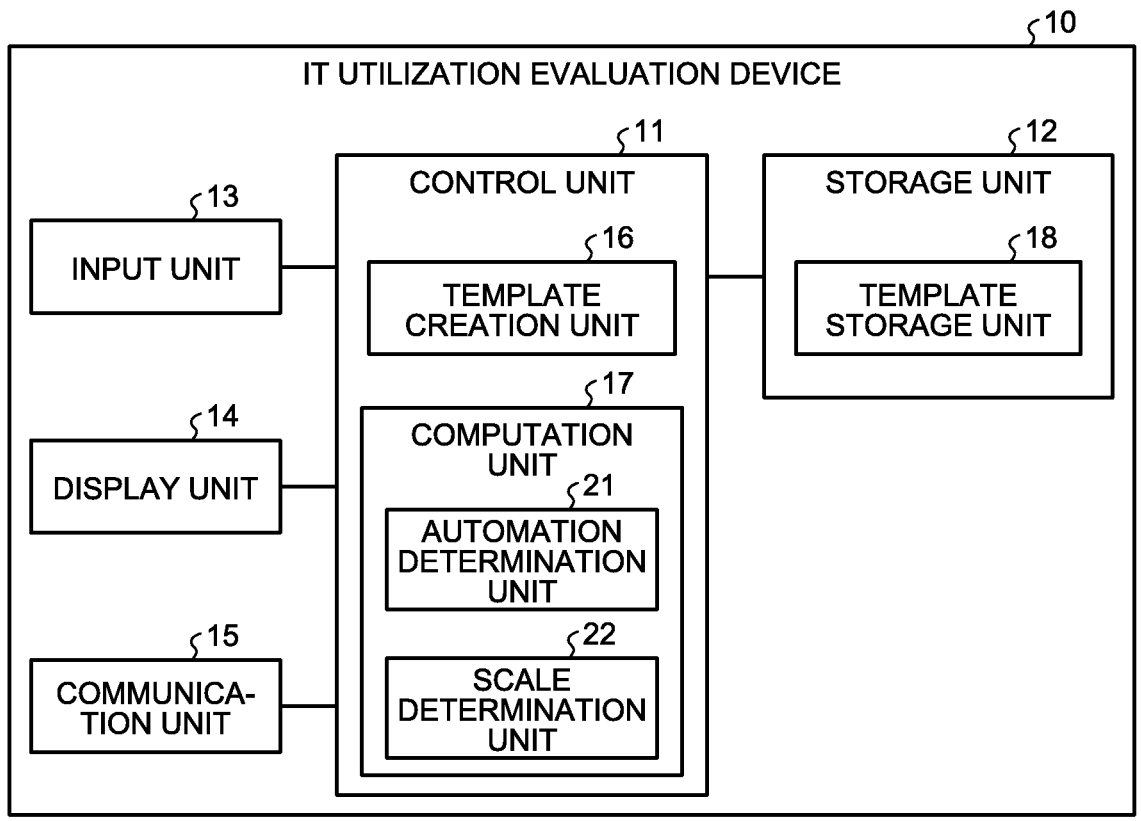
FIG. 1 is a block diagram illustrating a functional configuration of an IT utilization evaluation device according to a first embodiment of the present invention.

FIG. 1 is a block diagram illustrating a functional configuration of an IT utilization evaluation device 10 according to the first embodiment of the present invention. The IT utilization evaluation device 10 is a computer having an IT utilization evaluation program installed therein. The IT utilization evaluation program is a program for executing an IT utilization evaluation method. Individual functional units illustrated in FIG. 1 are implemented by a computer that is hardware executing the IT utilization evaluation program.

The IT utilization evaluation device 10 includes a control unit 11 that is a functional unit to control the IT utilization evaluation device 10 in its entirety. The control unit 11 includes a template creation unit 16 that is a functional unit to create a template, and a computation unit 17 that is a functional unit to perform computation processing. The computation unit 17 includes an automation determination unit 21 that is a first determination unit and a scale determination unit 22 that is a second determination unit.

The automation determination unit 21 is a functional unit that quantifies a first evaluation element representing the degree of IT-driven automation achieved in management of a unit process that is a constituent element of the management target process that is a target to be evaluated and that determines the attainment level of the first evaluation element in the target to be evaluated. The scale determination unit 22 is a functional unit that quantifies a second evaluation element representing the scale of a set of unit processes included in the management target process, where the set utilizes IT in management of the unit processes, and that determines the attainment level of the second evaluation element in the management target process. The attainment level of the second evaluation element represents the scale of the set of unit processes utilizing IT at a level corresponding to the attainment level of the first evaluation element in the management target process.

The template creation unit 16 creates a template for collecting information regarding automation in a unit process. On the basis of the information collected in the template, the automation determination unit 21 determines the attainment level of the first evaluation element. On the basis of the information collected in the template, the scale determination unit 22 determines the attainment level of the second evaluation element. The template and the determination methods in the automation determination unit 21 and the scale determination unit 22 are described later in detail.

The IT utilization evaluation device 10 includes a storage unit 12 that is a functional unit to store information. The storage unit 12 includes a template storage unit 18 that is a functional unit to store a template. The template storage unit 18 stores a template created by the template creation unit 16 and information input to the template.

Further, the IT utilization evaluation device 10 includes an input unit 13 that is a functional unit to receive an input operation to the IT utilization evaluation device 10, a display unit 14 that is a functional unit to display information, and a communication unit 15 that is a functional unit to communicate with devices outside the IT utilization evaluation device 10. The input unit 13 receives an input of information to be used to create a template and receives an input to the created template. The display unit 14 is a presentation unit that presents determination results of the attainment level of the first evaluation element and the attainment level of the second evaluation element by displaying the determination results on a screen.

Figure 2:
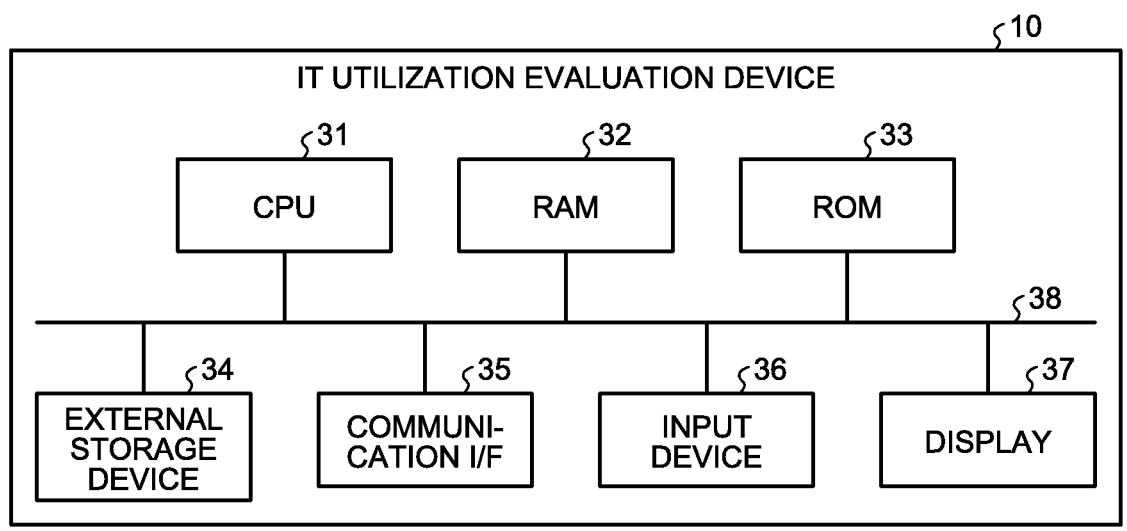
FIG. 2 is a block diagram illustrating a hardware configuration of the IT utilization evaluation device according to the first embodiment.

FIG. 2 is a block diagram illustrating a hardware configuration of the IT utilization evaluation device 10 according to the first embodiment. The IT utilization evaluation device 10 includes a central processing unit (CPU) 31 that performs various types of processing, a random access memory (RAM) 32 including a program storage area and a data storage area, a read only memory (ROM) 33 that is a nonvolatile memory, and an external storage device 34. The IT utilization evaluation device 10 further includes a communication interface (I/F) 35 that is an interface to connect with devices outside the IT utilization evaluation device 10, an input device 36 that receives an input operation to the IT utilization evaluation device 10, and a display 37 that displays information. The individual units of the IT utilization evaluation device 10 illustrated in FIG. 2 are connected to one another through a bus 38.

The CPU 31 executes programs stored in the ROM 33 and the external storage device 34. The ROM 33 has stored a basic input/output system (BIOS) or a unified extensible firmware interface (UEFI) that is a basic control program for computers. The external storage device 34 is a hard disk drive (HDD) or a solid state drive (SSD). The external storage device 34 stores the IT utilization evaluation program, a created template, and information input to the IT utilization evaluation device 10. The function of the storage unit 12 illustrated in FIG. 1 is implemented by using the external storage device 34. It is allowable that the IT utilization evaluation program is stored in the ROM 33.

The IT utilization evaluation program is loaded to the RAM 32. The CPU 31 loads the IT utilization evaluation program into the program storage area within the RAM 32 to perform various types of processing. The data storage area within the RAM 32 is a workspace for performing various types of processing. The external storage device 34 saves various types of information. The functions of the control unit 11 illustrated in FIG. 1 are implemented by using the CPU 31. The function of the communication unit 15 is implemented by using the communication I/F 35.

The input device 36 includes a keyboard and a pointing device. For example, the display 37 is a liquid crystal panel. The function of the input unit 13 illustrated in FIG. 1 is implemented by using the input device 36. The function of the display unit 14 is implemented by using the display 37.

Figure 3:
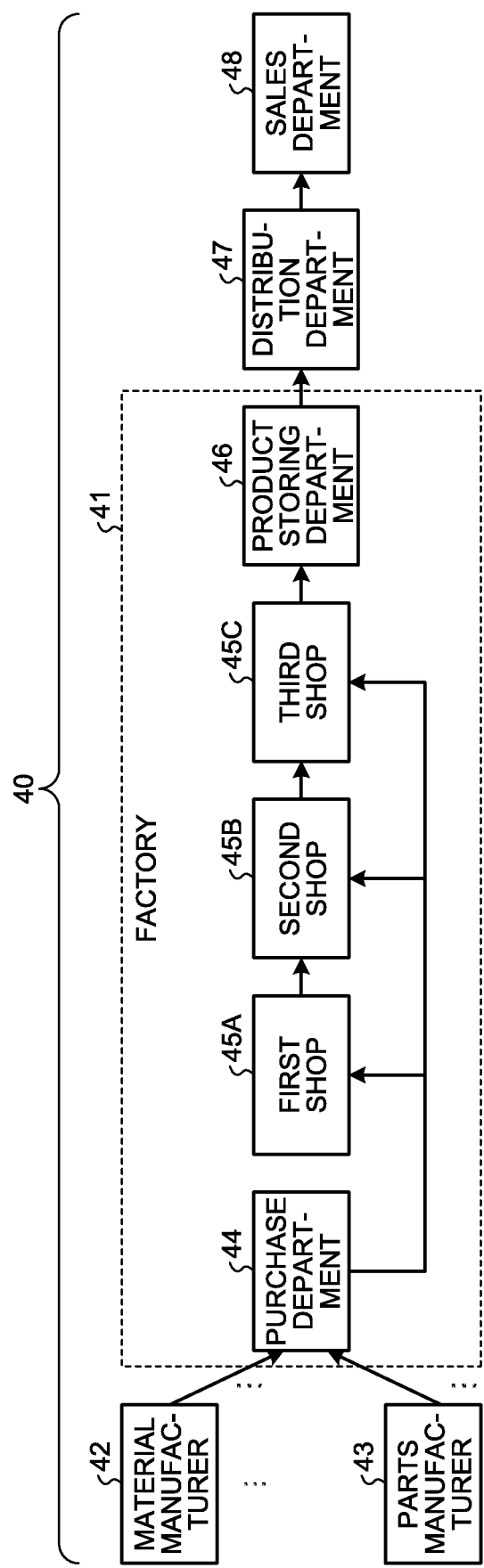
FIG. 3 is a block diagram illustrating an example configuration of a supply chain that is a target to be evaluated by the IT utilization evaluation device according to the first embodiment.

Next, descriptions are given of a supply chain that is a target to be evaluated by the IT utilization evaluation device 10 according to the first embodiment. FIG. 3 is a block diagram illustrating an example configuration of a supply chain 40 that is a target to be evaluated by the IT utilization evaluation device 10 according to the first embodiment. In the first embodiment, the supply chain 40 is defined as an overall sequence of work processes for product production, ranging from purchase of materials and parts to product sales. FIG. 3 illustrates individual work locations in the supply chain 40.

The supply chain 40 covers work in a material manufacturer 42 to ship product materials, work in a parts manufacturer 43 to ship product parts, work in a factory 41 to manufacture products, work in a distribution department 47 to distribute products, and work in a sales department 48 to sell products. In the factory 41, work in a purchase department 44 to purchase materials and parts, work in a first shop 45A, a second shop 45B, and a third shop 45C that are responsible for manufacturing processes, and work in a product storing department 46 to store products are performed. As an example, the IT utilization evaluation device 10 is installed in the factory 41. A user is defined as a person who uses the IT utilization evaluation device 10 to make evaluations of the degree of IT utilization. The IT utilization evaluation device 10 may be installed at a location other than the factory 41.

Materials are delivered from a plurality of material manufacturers 42 to the purchase department 44. Parts are delivered from a plurality of parts manufacturers 43 to the purchase department 44. The purchase department 44 stores the purchased materials and parts in the factory 41. The materials and parts stored in the factory 41 are supplied to the first shop 45A, the second shop 45B, and the third shop 45C.

Each of the first shop 45A, the second shop 45B, and the third shop 45c is a set of lines having similar manufacturing characteristics. As an example, workpiece machining is performed in the first shop 45A, assembly of the machined workpieces is performed in the second shop 45B, and inspection of the assembled products is performed in the third shop 45C. The product storing department 46 stores, in the factory 41, the products after having undergone the work process at the third shop 45C. The distribution department 47 transports the products from the factory 41 to the location of the sales department 48. The sales department 48 sells the delivered products. There may be any number of shops in the factory 41. The number of shops in the factory 41 is not limited to three.

Figure 4:
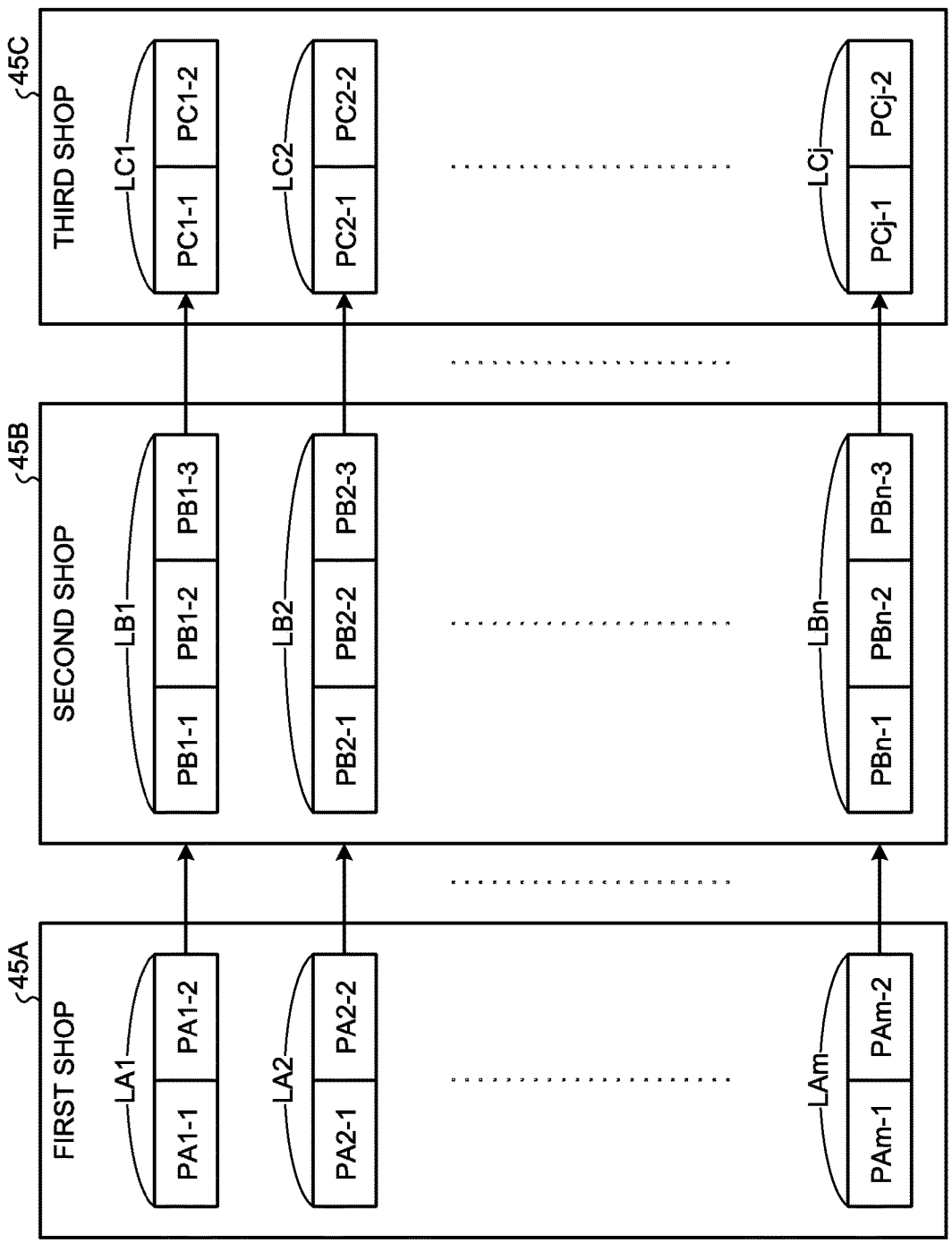
FIG. 4 is a block diagram illustrating an example configuration of a first shop, a second shop, and a third shop illustrated in FIG. 3.

FIG. 4 is a block diagram illustrating an example configuration of the first shop 45A, the second shop 45B, and the third shop 45C illustrated in FIG. 3. The first shop 45A includes m lines LA1, LA2, . . . , LAm, where m is any integer. The lines LA1, . . . , LAm have similar manufacturing characteristics to each other. The line LA1 is an array of two unit processes PA1-1 and PA1-2. The unit process includes work to be done during facilities' operation in accordance with instructions or a plan. The unit process may also include work to be done by workers. The unit process is defined as a constituent element of the supply chain 40. Each of the lines LA2, . . . , LAm other than the line LA1 is also an array of two unit processes in a similar manner to the line LA1.

The second shop 45B includes n lines LB1, LB2, . . . , LBn, where n is any integer. The lines LB1, . . . , LBn have similar manufacturing characteristics to each other. The line LB1 is an array of three unit processes PB1-1, PB1-2, and PB1-3. Each of the lines LB2, . . . , LBn other than the line LB1 is also an array of three unit processes in a similar manner to the line LB1.

The third shop 45C includes j lines LC1, LC2, . . . , LCj, where j is any integer. The lines LC1, . . . , LCj have similar manufacturing characteristics to each other. The line LC1 is an array of two unit processes PC1-1 and PC1-2. Each of the lines LC2, . . . , LCj other than the line LC1 is also an array of two unit processes in a similar manner to the line LC1.

In a similar manner to the first shop 45A, the second shop 45B, and the third shop 45C, the purchase department 44 and the product storing department 46, which are the locations inside the factory, also include a line that is an array of unit processes. Further, the material manufacturer 42, the parts manufacturer 43, the distribution department 47, and the sales department 48, which are the locations outside the factory, also include a line that is an array of unit processes. As described above, the supply chain 40 includes a unit process, a line that is a first set constituted by an array of unit processes, a shop that is a set of lines, and a location that is a set of lines. In the first embodiment, the shop and the location are of the same kind and are both treated as a second set. In the following explanations, the concept of "shop" includes not only the first shop 45A, the second shop 45B, and the third shop 45C, but also includes the respective locations of the purchase department 44, the product storing department 46, the material manufacturer 42, the parts manufacturer 43, the distribution department 47, and the sales department 48 in some cases.

The supply chain 40 is a third set that is a set of shops. Regarding the scale of a set in the supply chain 40, a line is smaller than a shop and a shop is smaller than the supply chain 40. Lines of the shop do not necessarily need to include the same number of unit processes. It is allowable that lines of the shop include a line that includes unit processes different in number from those of other lines. A line does not necessarily need to include a plurality of unit processes. It is allowable that a line includes only a single unit process. A shop does not necessarily need to include a plurality of lines. It is allowable that a shop includes only a single line.

Figure 5:
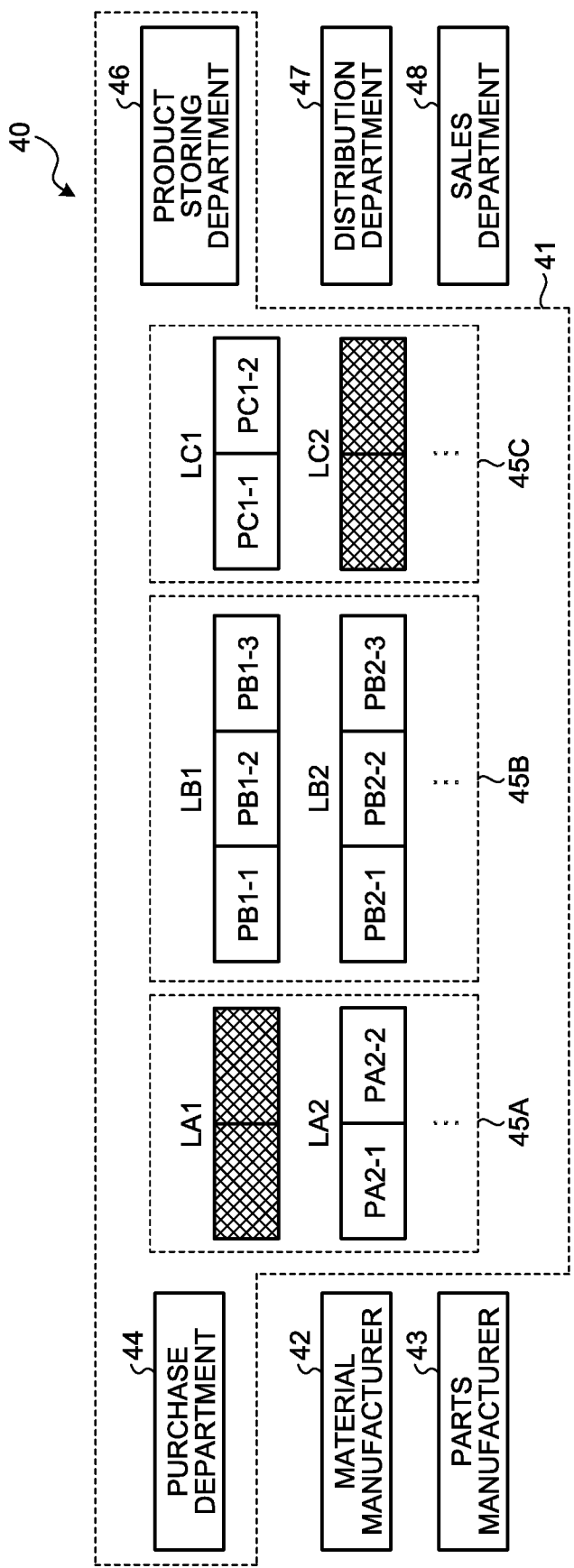
FIG. 5 is an explanatory diagram of the automation level that is a first evaluation element and the scale level that is a second evaluation element to be evaluated by the IT utilization evaluation device illustrated in FIG. 1.

Next, descriptions are given of the automation level that is the first evaluation element and the scale level that is the second evaluation element. FIG. 5 is an explanatory diagram of the automation level that is the first evaluation element and the scale level that is the second evaluation element to be evaluated by the IT utilization evaluation device 10 illustrated in FIG. 1.

In the supply chain 40, the state of facilities and their actual operational performance or workers' actual performance in each unit process is obtained to determine whether there is a gap between planned production and actual production and take corrective action to this gap. In some cases, work processes may undergo improvements in order to improve the product quality, increase the productivity, and increase the ability to meet the scheduled product delivery times. In order to efficiently produce successful results, it is effective to promote IT-driven automation in process management ranging from collecting information for obtaining the actual operational performance and the actual work performance to improving the work processes. For this reason, in the first embodiment, the automation level that is the degree of automation achieved in unit-process management is defined as the first evaluation element.

In the supply chain 40, it is often difficult to introduce IT simultaneously into all the unit processes. In the supply chain 40, IT is typically introduced into the unit processes in stages. It is effective to extend IT utilization in process management not only to manufacturing processes in the factory 41, but also to purchase and storage of materials and parts as well as to product storage, delivery, and sales. Expansion of the scale of IT utilization makes it possible to efficiently obtain a greater effect on the inventory plan intended to optimize the production plan based on a sales forecast, to optimize the delivery plan for material and parts, and to minimize the inventory balance. Thus, in the first embodiment, the scale level that is the scale of a set utilizing IT in management of unit processes is defined as the second evaluation element. In the first embodiment, IT introduction in the supply chain 40 is implemented beginning from the factory 41 where the IT utilization evaluation device 10 has been installed. After IT introduction has been progressively implemented in the shops inside the factory 41, IT introduction is then implemented in shops outside the factory 41.

In the IT utilization evaluation device 10, four criteria levels of quantification of the automation level are defined. An automation level "1" that is the lowest of the four levels is defined as a level at which data to be used in process management can be automatically collected and accumulated. An automation level "2" that is one stage higher than the automation level "1" is defined as a level at which data can be automatically visualized in order to display the collected or accumulated data in addition to the automation level "1". An automation level "3" that is one stage higher than the automation level "2" is defined as a level at which data can be automatically analyzed and thereby diagnosed in addition to the automation level "2". An automation level "4" is one stage higher than the automation level "3" and is the highest of the four levels. The automation level "4" is defined as a level at which control of the unit processes can be automatically executed in accordance with the diagnostic results.

The phrase "can be automatically" basically means that intended operation does not involve manpower. However, it is allowable that the intended operation is partially performed with manpower. As an example, an input operation to the automated sections may include simple manual work done by workers. The criteria levels to determine the automation level are not limited to four. There are any number of criteria levels. The descriptions of the definition of the automation levels are not limited to those described in the first embodiment, and may be appropriately changed. As an example, the descriptions of the definition are set in advance in the IT utilization evaluation device 10. It is also allowable that the descriptions of the definition are set by a user who uses the IT utilization evaluation device 10 to make evaluations.

In some cases, the supply chain 40 may include a unit process that cannot utilize IT for a management function. Examples of the unit process that cannot utilize IT for a management function include sensory testing. The IT utilization evaluation device 10 excludes a unit process that is not targeted for IT introduction, and then determines the automation level and the scale level in the supply chain 40. In the example illustrated in FIG. 5, the unit processes of two hatched lines LA1 and LC2 are not targeted for IT introduction for a certain management function. In the first shop 45A, the second shop 45B, and the third shop 45C, the unit processes of all the lines except for the two lines LA1 and LC2 are targeted for IT introduction for the certain management function.

In the IT utilization evaluation device 10, four criteria levels of quantification of the scale level are defined. Descriptions of the definition of the four levels indicate a status of IT introduction into the target unit processes. A scale level "1" that is the lowest of the four levels is defined as a level at which there is one or more unit processes, into which IT has been introduced, inside the factory 41. As an example, the condition of the scale level "1" is satisfied when IT is introduced into a single unit process PB2-2 in the factory 41 in which IT has not been introduced into any of the unit processes illustrated in FIG. 5.

A scale level "2" that is one stage higher than the scale level "1" is defined as a level at which there is one or more lines, on each of which IT has been introduced into all the unit processes, inside the factory 41. As an example, the condition of the scale level "2" is satisfied when IT is introduced into two unit processes PB2-1 and PB2-3 on the line LB2 in which IT has been introduced only into the unit process PB2-2.

A scale level "3" that is one stage higher than the scale level "2" is defined as a level at which IT has been introduced into all the lines inside the factory 41, except a line that includes a unit process that is not targeted for IT introduction. A scale level "4" is one stage higher than the scale level "3" and is the highest of the four levels. The scale level "4" is defined as a level at which IT has been introduced into all the lines in the supply chain 40, except a line that includes a unit process that is not targeted for IT introduction.

If the scale level "1", "2", or "3" is increased by one stage, a significant amount of manpower and effort is required for IT introduction. Under circumstances where IT is introduced gradually, if the evaluation remains unchanged because the definition of the level at each stage is not satisfied, this prevents the current status of IT introduction from being properly reflected in evaluations and prevents correct and useful evaluations from being made. The IT utilization evaluation device 10 is capable calculating the attainment level, which is intermediate between the defined levels, by means of quantification and thus makes it possible to properly reflect the current status of IT introduction in evaluations.

IT introduction inside the factory 41 includes additional introduction in a shop and new introduction in a shop. In a case of the additional introduction, the shop includes a line into which IT introduction has been completed. In a case of the new introduction, the shop does not include a line into which IT introduction has been completed. When these two cases are compared with each other, it is more difficult to achieve the latter case, i.e., new introduction, than the former case, i.e., additional introduction. In view of the circumstances, the IT utilization evaluation device 10 is capable of quantifying the attainment level in such a manner that when the new introduction as described above is achieved, the attainment level in this case becomes higher than the other case, and is thus capable of making evaluations according to the difficulty in IT introduction.

Figure 6:
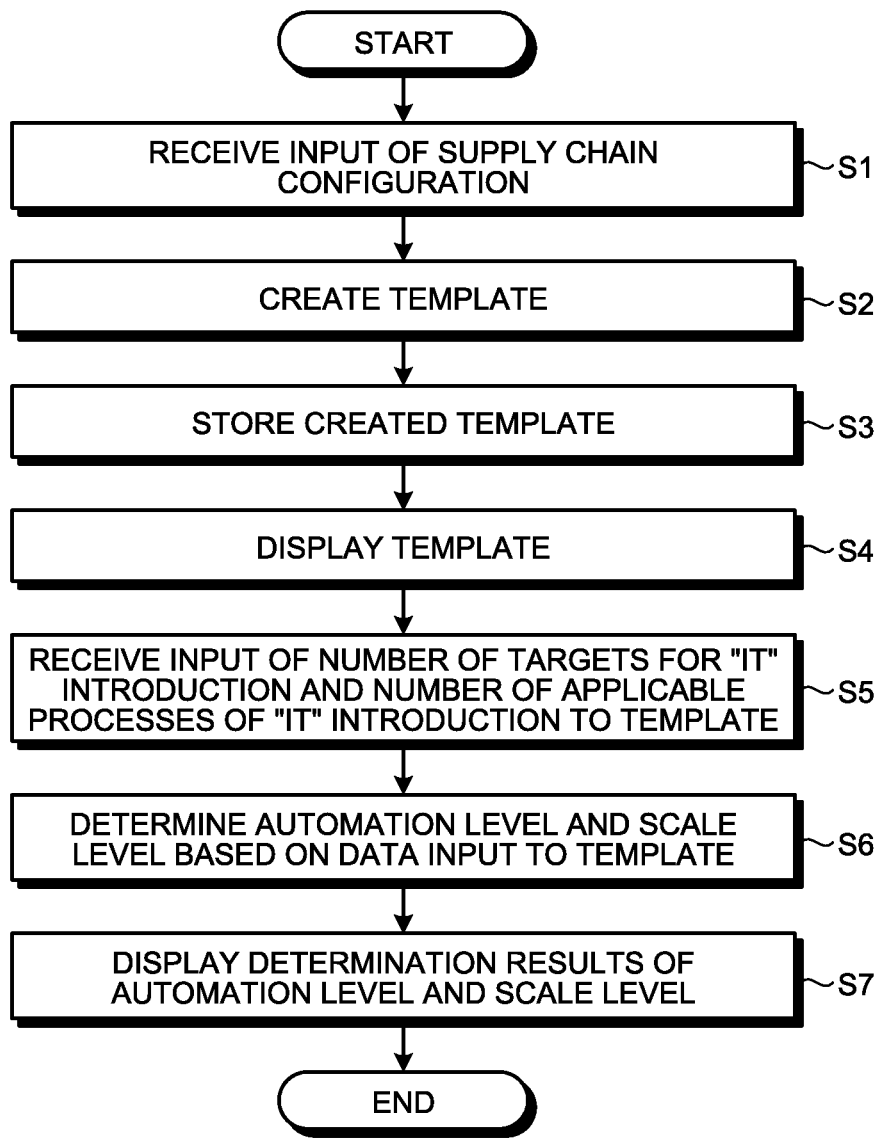
FIG. 6 is a flowchart illustrating an operational procedure for the IT utilization evaluation device according to the first embodiment.

FIG. 6 is a flowchart illustrating an operational procedure for the IT utilization evaluation device 10 according to the first embodiment. Steps S1 to S3 in the procedure illustrated in FIG. 6 are steps that are intended to prepare a template and are performed before the evaluation procedure. At Step S1, in the IT utilization evaluation device 10, the input unit 13 illustrated in FIG. 1 receives an input of the configuration of the supply chain 40 that is a management target process. In the IT utilization evaluation device 10, the display unit 14 illustrated in FIG. 1 displays an input format. A user inputs data to the input format displayed on the display unit 14 to thereby input the configuration of the supply chain 40.

Figure 7:
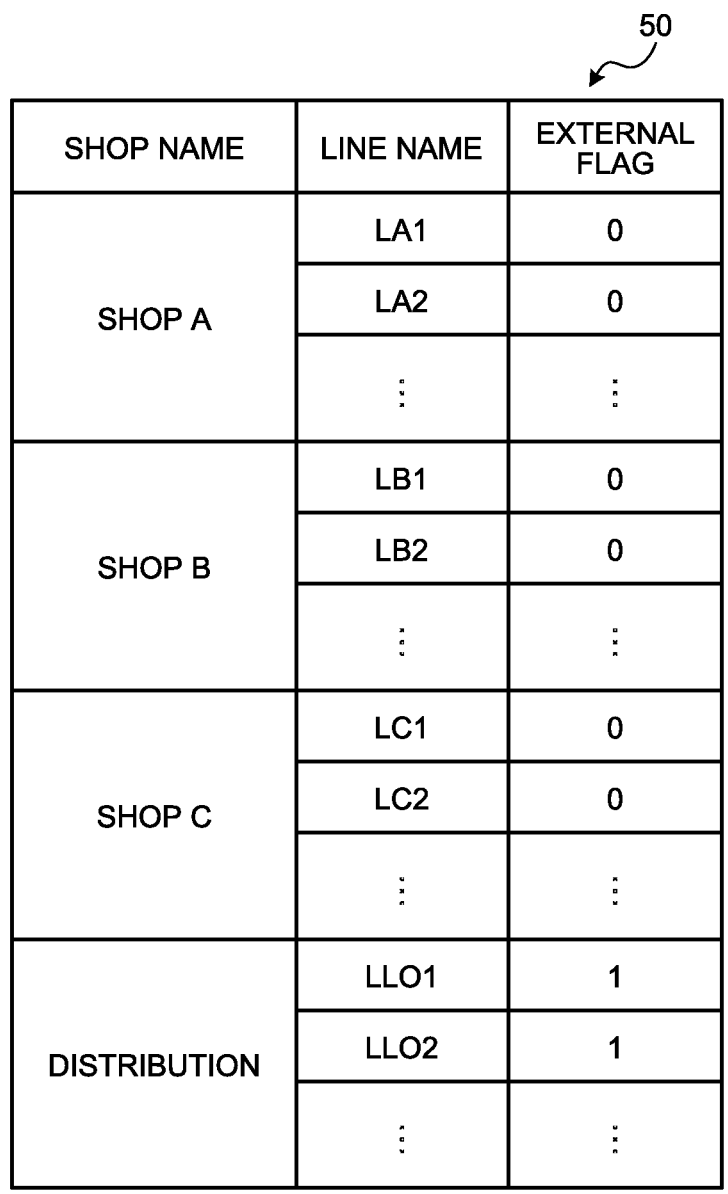
FIG. 7 is a diagram illustrating an example of input of configuration data of a supply chain illustrated in FIG. 3.

FIG. 7 is a diagram illustrating an example of input of the configuration data of the supply chain 40 illustrated in FIG. 3. An input format 50 illustrated in FIG. 7 includes input fields for inputting shop name, line name, and external flag. The shop name is a name that represents each shop included in the supply chain 40. "Shop A" is the shop name of the first shop 45A illustrated in FIG. 3. "Shop B" is the shop name of the second shop 45B. "Shop C" is the shop name of the third shop 45C. "Distribution" is the shop name of the distribution department 47.

The line name is a name given to each line. The line name "LA1" illustrated in FIG. 7 is the name of the line LA1 illustrated in FIG. 4. The external flag is a flag that indicates whether each of the lines is present inside the factory 41 or outside the factory 41. In the example illustrated in FIG. 7, flag "0" indicates that the line is present inside the factory 41. Flag "1" indicates that the line is present outside the factory 41.

A user inputs "shop A" to the shop-name field and inputs the line names "LA1", "LA2", . . . of the respective lines of the first shop 45A to the line-name field corresponding to the "shop A". A user further inputs "0" as the external flag of the individual lines of the first shop 45A. A user inputs the shop name, the line name, and the external flag of the other shops in the same manner as the first shop 45A. A user inputs "1" as the external flag of the lines of a shop outside the factory 41. In the input format 50 illustrated in FIG. 7, "1" is input as the external flag of the lines of "distribution". Information regarding unit processes included in a line is not input at Step S1.

When the input at Step S1 illustrated in FIG. 6 is completed, the template creation unit 16 illustrated in FIG. 1 in the IT utilization evaluation device 10 creates a template at Step S2. The template creation unit 16 creates a template on the basis of the data input at Step S1. When creation of a template is completed, the IT utilization evaluation device 10 stores the created template in the template storage unit 18 at Step S3.

FIG. 8 is a diagram illustrating an example of a template 51 created by the template creation unit 16 illustrated in FIG. 1. FIG. 8 illustrates a part of the template 51 for the line LA1 of the first shop 45A. On the basis of the data input at Step S1, the template creation unit 16 creates the template 51 for each of the lines included in the supply chain 40.

The template 51 includes the fields in which the shop name and the line name are set, the field in which the management functions are set, the field in which items are set for each of the management functions, the field in which the automation level is set for each of the items, and the input fields for inputting the number of targets and the number of applicable processes. The management function refers to a function of IT-driven process management. FIG. 8 illustrates a part of the template 51 including the fields "facility operation management" and "quality management" that are the management functions. The management functions may include other management functions which can be covered by the process management, such as production volume management, in addition to "facility operation management" and "quality management".

In the item field, the points for checking the automation status in management of a unit process are set in a question format. The items included in the template 51 are numbered. In the template 51 illustrated in FIG. 8, 20 items corresponding to the "facility operation management" are set. Among the 20 items, the item "No. 1" that is "Is the machining start time for each workpiece computerized?" is a check point for automation of collection and accumulation of the machining start time data to be used in the facility operation management. The item "No. 6" that is "Is the cycle time visualized?" is a check point for automation of visualization of the cycle time data to be used in the facility operation management. The items related to automation are also set for the management functions other than "facility operation management".

In the template 51, the automation level is set for each item. The automation level is a criterion for determining the degree of automation achieved that is the first evaluation element. The automation determination unit 21 illustrated in FIG. 1 quantifies the degree of automation achieved that is the first evaluation element on the basis of the automation level set for each item. The scale determination unit 22 quantifies the scale of a set that is the second evaluation element on the basis of the automation level set for each item.

In the template 51 illustrated in FIG. 8, the automation level "1" is set for the item "No. 1" regarding automation of data collection and accumulation. The automation level "2"

is set for the item "No. 6" regarding automation of data visualization. Likewise, the automation level is set for the other items.

The template creation unit 16 creates a common template 51 for all the lines regardless of which shop a line belongs to. Data of the management function, the item, and the automation level, which serve as the basis of information used to create the template 51, is stored in the template storage unit 18 in advance. It is allowable that a user sets the automation level for each item.

The number of targets indicates the number of unit processes targeted for IT introduction among the entire unit processes included in a line. The number of applicable processes indicates the number of unit processes into which IT has already been introduced. The template 51 includes the input fields for inputting the number of targets and the number of applicable processes for each item.

After preparation of the template 51 is completed in accordance with the procedure at Steps S1 to S3, the IT utilization evaluation device 10 makes evaluations in accordance with the procedure at Step S4 and the subsequent steps. When the IT utilization evaluation device 10 makes evaluations, the control unit 11 illustrated in FIG. 1 reads the template 51 from the template storage unit 18. At Step S4, the IT utilization evaluation device 10 displays the template 51 read by the control unit 11 on the display unit 14. At Step S5, in the IT utilization evaluation device 10, the input unit 13 illustrated in FIG. 1 receives an input of the number of targets and an input of the number of applicable processes to the template 51. A user inputs the number of targets and the number of applicable processes to each item of the template 51 displayed on the display unit 14.

In the template 51 illustrated in FIG. 8, a user inputs the number of unit processes, which are targeted for computerization of the machining start time for each workpiece, among the entire unit processes of the line LA1, in the "number of targets" field for the item "No. 1". A user further inputs the number of unit processes, in which the machining start time for each workpiece has already been computerized, among the entire unit processes of the line LA1, in the "number of applicable processes" field for the item "No. 1". A user also inputs the number of targets and the number of applicable processes in the corresponding fields for the other items in the same manner as the item "No. 1". The ratio between the number of applicable processes and the number of targets represents the degree of automation achieved for each item. The IT utilization evaluation device 10 can obtain the degree of automation achieved for each item which matches the real circumstances by excluding the number of unit processes that are not targeted for IT introduction from the total number of targets.

As an example, a line included in the "distribution" shop does not include a unit process that needs to satisfy the item "No. 1". In the template 51 for the line described above, "0" is input as the number of targets for the item "No. 1", so that this line is excluded from the targets for evaluation of the item "No. 1". The IT utilization evaluation device 10 is capable of making quantitative evaluations after having excluded data of a management function for which an evaluation improvement is not expected. This can prevent the management function from continuously receiving a low evaluation when this management function cannot expect an evaluation improvement.

At Step S6, the automation determination unit 21 illustrated in FIG. 1 determines the automation level in the supply chain 40 in its entirety on the basis of data that is the number of targets and the number of applicable processes which are input to the template 51. The automation determination unit 21 quantifies the automation level in the supply chain 40 in its entirety and determines the attainment level of the degree of automation achieved in the supply chain 40. The scale determination unit 22 illustrated in FIG. 1 determines the scale level in the supply chain 40 in its entirety on the basis of data that is the number of targets and the number of applicable processes which are input to the template 51. The scale determination unit 22 quantifies the scale level in the supply chain 40 in its entirety and determines the attainment level of the scale of a set utilizing IT. At Step S7, the IT utilization evaluation device 10 displays the determination results of the automation level and the scale level obtained at Step S6 on the display unit 14.

Next, a determination of the attainment level in the automation determination unit 21 is described. FIG. 9 is an explanatory diagram of a determination of the attainment level in the automation determination unit 21 illustrated in FIG. 1. The automation determination unit 21 determines the attainment level of the degree of automation achieved on the basis of the information collected in the template 51 illustrated in FIG. 8. The automation determination unit 21 determines the attainment level of the degree of automation achieved in the supply chain 40 for five management functions including the facility operation management function and the quality management function illustrated in FIG. 8. "AA management" illustrated in FIG. 9 is one of the five management functions and is defined as, for example, facility operation management. In FIG. 9, the items with the automation level "1", the number of targets, and the number of applicable processes for "AA management" are collected in relation to each of the lines of "shop A" and "shop B" among the lines within the supply chain 40.

The automation determination unit 21 calculates the attainment level of the degree of automation achieved for each management function and for each automation level set for the items. The automation determination unit 21 calculates an attainment level $Y_1$ of the item with the automation level "1" by using the following equation (1). In the equation (1), $N_{F1}$ represents the number of items with the automation level "1" among the items of each individual management function. $N_{A1}$ represents the number of items that include a line in which the number of applicable processes is equal to or greater than one among the items with the automation level "1".

$$Y_1 = N_{A1}/N_{F1} \qquad (1)$$

In the data illustrated in FIG. 9, there are five items with the automation level "1" in "AA management", i.e., the items "No. AA1" to "No. AA5"; therefore, $N_{F1}=5$ is derived. Four of the five items, i.e., "No. AA1" to "No. AA4" each include a line in which the number of applicable processes is equal to or greater than one; therefore, $N_{A1}=4$ is derived. Thus, $Y_1=4/5=0.8$ is calculated by using the equation (1).

The automation determination unit 21 calculates individual attainment levels $Y_2$, $Y_3$, and $Y_4$ of the items with the automation levels "2", "3", and "4", respectively, by using the following equations (2) to (4). In the equation (2), $N_{F2}$ represents the number of items with the automation level "2" among the items of each individual management function. $N_{A2}$ represents the number of items that include a line in which the number of applicable processes is equal to or greater than one among the items with the automation level "2". In the equation (3), $N_{F3}$ represents the number of items with the automation level "3" among the items of each individual management function. $N_{A3}$ represents the number of items that include a line in which the number of applicable processes is equal to or greater than one among the items with the automation level "3". In the equation (4), $N_{F4}$ represents the number of items with the automation level "4" among the items of each individual management function. $N_{A4}$ represents the number of items that include a line in which the number of applicable processes is equal to or greater than one among the items with the automation level "4".

$$Y_2 = (N_{A2}/N_{F2}) + 1 \tag{2}$$

$$Y_3 = (N_{A3}/N_{F3}) + 2 \tag{3}$$

$$Y_4 = (N_{A4}/N_{F4}) + 3 \tag{4}$$

The automation determination unit 21 also calculates the attainment level of the degree of automation achieved for four management functions other than "AA management" for each automation level set for the items, in the same manner as "AA management".

Next, a determination of the attainment level in the scale determination unit 22 is described. FIG. 10 is an explanatory diagram of a determination of the attainment level in the scale determination unit 22 illustrated in FIG. 1. The scale determination unit 22 determines the attainment level of the scale of a set utilizing IT on the basis of the information collected in the template 51 illustrated in FIG. 8. The scale determination unit 22 determines the attainment level of the scale of a set utilizing IT in the supply chain 40 for five management functions in the same manner as the automation determination unit 21. "BB management" illustrated in FIG. 10 is defined as one of the five management functions. In FIG. 10, the items with the automation level "1", the number of targets, and the number of applicable processes for "BB management" are collected in relation to each of the lines of "shop A", "shop B", and "distribution" among the lines within the supply chain 40.

The scale determination unit 22 calculates the attainment level of the scale of a set utilizing IT for each management function and for each automation level set for the items. In this example, the scale determination unit 22 calculates the attainment level of the items of "BB management" with the automation level "1". The scale determination unit 22 calculates attainment levels $X_{BB1}$, $X_{BB2}$, of the respective items on the basis of data in the . . . template 51 for each line. The scale determination unit 22 averages the attainment levels $X_{BB1}$, $X_{BB2}$ . . . of the respective items to thereby calculate an attainment level $X_1$ of the items with the automation level "1".

Figure 11:
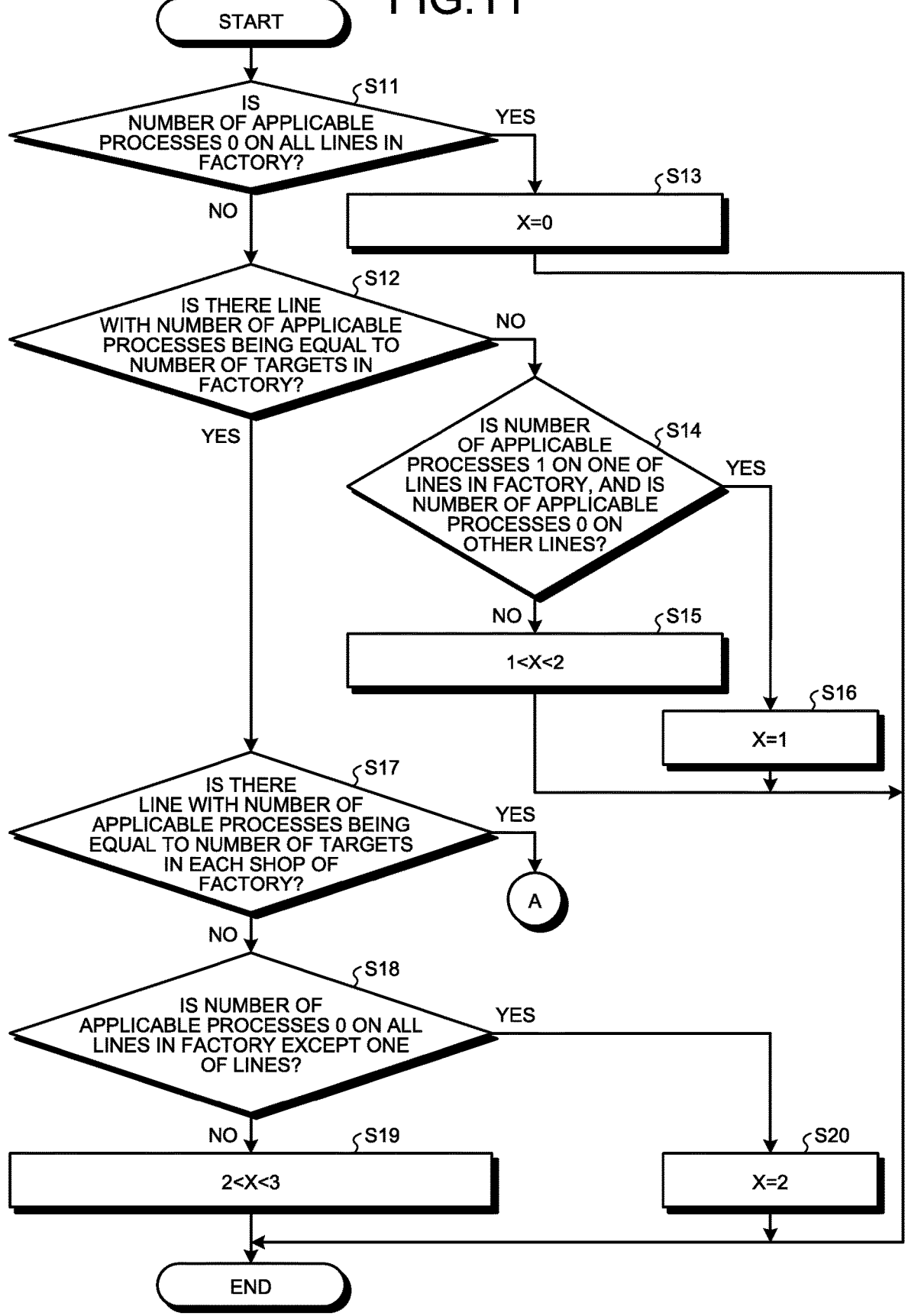
FIG. 11 is a flowchart illustrating a procedure for the scale determination unit illustrated in FIG. 1 to calculate the attainment level of each item.
Figure 12:
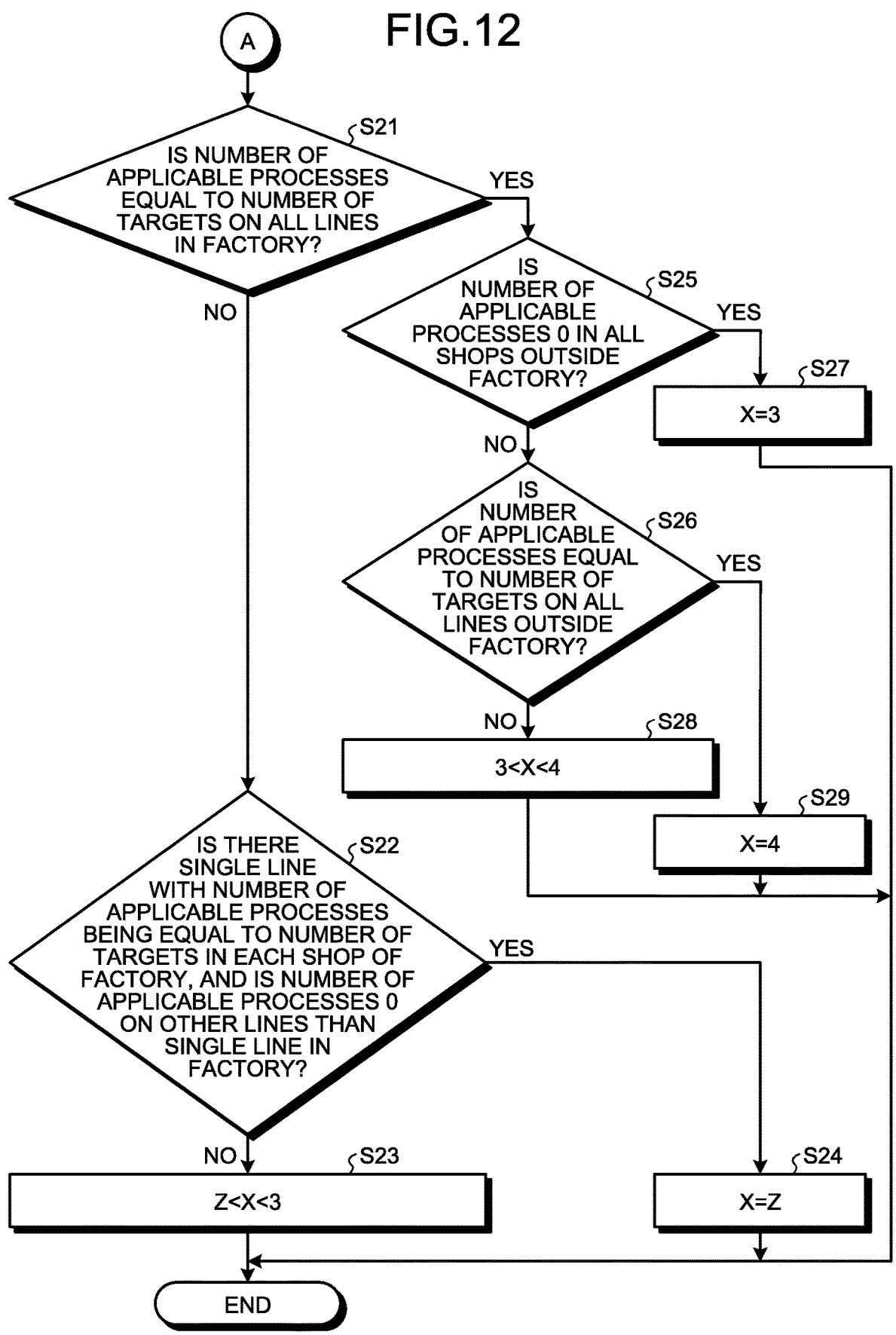
FIG. 12 is a flowchart illustrating a procedure for the scale determination unit illustrated in FIG. 1 to calculate the attainment level of each item.

FIGS. 11 and 12 are flowcharts illustrating a procedure for the scale determination unit 22 illustrated in FIG. 1 to calculate the attainment level of each item. At Step S11, the scale determination unit 22 references the template 51 for all the lines in the factory 41 and determines whether the number of applicable processes is 0 on all the lines in the factory 41. When the number of applicable processes is 0 on all the lines in the factory 41 (YES at Step S11), the scale determination unit 22 calculates an attainment level X=0 at Step S13.

In the data illustrated in FIG. 10, the number of applicable processes for the item "No. BB1" is 0 on all the lines inside the factory 41 including the lines of "shop A" and "shop B". Because the item "No. BB1" satisfies the condition at Step S11, the scale determination unit 22 calculates the attainment level X of the item "No. BB1" as $X_{BB1}=0$ at Step S13.

When the lines in the factory 41 include a line with the number of applicable processes being other than 0 (NO at Step S11), the scale determination unit 22 determines whether, in the factory 41, there is a line with the number of applicable processes being equal to the number of targets at Step S12. In the factory 41, when there is no line with the number of applicable processes being equal to the number of targets (NO at Step S12), the scale determination unit 22 determines whether the number of applicable processes is 1 on one of the lines in the factory 41 and the number of applicable processes is 0 on the other lines at Step S14. When the number of applicable processes is 1 on one of the lines in the factory 41 and the number of applicable processes is 0 on the other lines (YES at Step S14), the scale determination unit 22 calculates the attainment level X=1 at Step S16.

In the data illustrated in FIG. 10, the number of applicable processes for the item "No. BB2" is 1 on one of the lines, i.e., the line LA1, and the number of applicable processes is 0 on the other lines. Because the item "No. BB2" does not satisfy the condition at Step S12 but satisfies the condition at Step S14, the scale determination unit 22 calculates the attainment level X of the item "No. BB2" as $X_{BB2}=1$ at Step S16.

When the condition that the number of applicable processes is 1 on one of the lines and the number of applicable processes is 0 on the other lines is not satisfied (NO at Step S14), the scale determination unit 22 calculates an attainment level X that satisfies 1<X<2 at Step S15. As an example, the scale determination unit 22 calculates the attainment level X by using the following equation (5) at Step S15. In the equation (5), $N_{BA}$ represents the total number of targets inside the factory 41. $N_{BLI}$ represents the number of lines inside the factory 41. $N_{BB}$ represents the total number of applicable processes inside the factory 41. In the equation (5), X is a logarithm to the base $N_{BA}-N_{BLI}+1$ of $N_{BB}$.

$$X = \log[N_{BA} - N_{BLI} + 1] N_{BB} \tag{5}$$

In the data illustrated in FIG. 10, both the items "No. BB3" and "No. BB4" do not satisfy either the condition at Step S12 or the condition at Step S14. At Step S15, the scale determination unit 22 calculates the attainment levels $X=X_{BB3}$ and $X_{BB4}$ of the items "No. BB3" and "No. BB4", respectively, which satisfy 1<X<2.

In the factory 41, when there is a line with the number of applicable processes being equal to the number of targets (YES at Step S12), the scale determination unit 22 determines whether, in each shop of the factory 41, there is a line with the number of applicable processes being equal to the number of targets at Step S17. In the factory 41, when there is a shop that does not include a line with the number of applicable processes being equal to the number of targets (NO at Step S17), the scale determination unit 22 determines whether the number of applicable processes is 0 on all the lines in the factory 41 except one of the lines at Step S18.

When the number of applicable processes is 0 on all the lines except one of the lines (YES at Step S18), the scale determination unit 22 calculates the attainment level X=2 at Step S20. In the data illustrated in FIG. 10, the item "No. BB5" does not satisfy the condition at Step S17 but satisfies the condition at Step S18. The scale determination unit 22 calculates the attainment level X of the item "No. BB5" as $X_{BB5}=2$ at Step S20. When the condition that the number of applicable processes is 0 on all the lines except one of the lines is not satisfied (NO at Step S18), the scale determination unit 22 calculates an attainment level X that satisfies 2<X<Z at Step S19, where Z is any value that satisfies 2<Z<3. In the first embodiment, Z=2.6.

As an example, the scale determination unit 22 calculates the attainment level X by using the following equation (6) at Step S19. In the equation (6), $N_{BLI}$ represents the number of lines inside the factory 41. $N_{BSI}$ represents the number of shops inside the factory 41. $N_{BBLI}$ represents the number of lines with the number of applicable processes being equal to the number of targets among the lines inside the factory 41.

$$X=2+(Z-2)\log[N_{BLI}-N_{BSI}+1]N_{BBLI} \quad (6)$$

In the data illustrated in FIG. 10, both the items "No. BB6" and "No. BB7" do not satisfy either the condition at Step S17 or the condition at Step S18. At Step S19, the scale determination unit 22 calculates the attainment levels $X=X_{BB6}$ and $X_{BB7}$ of the items "No. BB6" and "No. BB7", respectively, which satisfy 2<X<Z.

In each shop of the factory 41, when there is a line with the number of applicable processes being equal to the number of targets (YES at Step S17), the scale determination unit 22 determines whether the number of applicable processes is equal to the number of targets on all the lines in the factory 41 at Step S21. When the factory 41 includes a line with the number of applicable processes not being equal to the number of targets (NO at Step S21), the scale determination unit 22 advances the procedure to Step S22. At Step S22, the scale determination unit 22 determines whether, in each shop of the factory 41, there is a single line with the number of applicable processes being equal to the number of targets and the number of applicable processes is 0 on the lines other than the single line in the factory 41.

When the condition at Step S22 is satisfied (YES at Step S22), the scale determination unit 22 calculates the attainment level X=Z at Step S24. The item "No. BB8" does not satisfy the condition at Step S21 but satisfies the condition at Step S22. The scale determination unit 22 calculates the attainment level X of the item "No. BB8" as $X_{BB8}$=Z at Step S24. When "No. BB8" is compared to "No. BB6" and "No. BB7", "No. BB8" shows that IT introduction into all the target unit processes on the initial line LB1 of "shop B" has been completed. Since new IT introduction has been completed in "shop B", the scale determination unit 22 quantifies the attainment level of the item "No. BB8" so as to become higher than the other cases.

When the condition at Step S22 is not satisfied (NO at Step S22), the scale determination unit 22 calculates an attainment level X that satisfies Z<X<3 at Step S23. As an example, the scale determination unit 22 calculates the attainment level X by using the following equation (7) at Step S22. In the equation (7), $N_{BLI}$ represents the number of lines inside the factory 41. $N_{BSI}$ represents the number of shops inside the factory 41. $N_{BBLI}$ represents the number of lines with the number of applicable processes being equal to the number of targets among the lines inside the factory 41.

$$X=Z+(3-Z)\log[N_{BLI}-N_{BSI}+1]N_{BBLI} \quad (7)$$

In the data illustrated in FIG. 10, the item "No. BB9" does not satisfy either the condition at Step S21 or the condition at Step S22. At Step S23, the scale determination unit 22 calculates the attainment level $X=X_{BB9}$ of the item "No. BB9", which satisfies Z<X<3.

When the number of applicable processes is equal to the number of targets on all the lines in the factory 41 (YES at Step S21), the scale determination unit 22 determines whether the number of applicable processes is 0 in all the shops outside the factory 41 at Step S25. When the number of applicable processes is 0 in all the shops outside the factory 41 (YES at Step S25), the scale determination unit 22 calculates the attainment level X=3 at Step S27. The item "No. BB10" satisfies both the condition at Step S21 and the condition at Step S25. The scale determination unit 22 calculates the attainment level X of the item "No. BB10" as $X_{BB10}$=3 at Step S27.

When the shops outside the factory 41 include a shop with the number of applicable processes not being 0 (NO at Step S25), the scale determination unit 22 determines whether the number of applicable processes is equal to the number of targets on all the lines outside the factory 41 at Step S26. When the number of applicable processes is equal to the number of targets on all the lines outside the factory 41 (YES at Step S26), the scale determination unit 22 calculates the attainment level X=4 at Step S29.

The item "No. BB12" does not satisfy the condition at Step S25 but satisfies the condition at Step S26. The scale determination unit 22 calculates the attainment level X of the item "No. BB12" as $X_{BB12}$=4 at Step S29.

When the lines outside the factory 41 include a line with the number of applicable processes not being equal to the number of targets (NO at Step S26), the scale determination unit 22 calculates an attainment level X that satisfies 3<X<4 at Step S28. As an example, the scale determination unit 22 calculates the attainment level X by using the following equation (8) at Step S28. In the equation (8), $N_{BLO}$ represents the number of lines outside the factory 41. $N_{BSO}$ represents the number of shops outside the factory 41. $N_{BBLO}$ represents the number of lines with the number of applicable processes being equal to the number of targets among the lines outside the factory 41.

$$X=3+\log[N_{BLO}-N_{BSO}+1]N_{BBLO} \quad (8)$$

In the data illustrated in FIG. 10, the item "No. BB11" does not satisfy either the condition at Step S25 or the condition at Step S26. At Step S28, the scale determination unit 22 calculates the attainment level $X=X_{BB11}$ of the item "No. BB11", which satisfies 3<X<4.

The scale determination unit 22 averages the attainment levels $X_{BB1}, \ldots, X_{BB12}$ of the respective items by using the following equation (9) to calculate an attainment level $X_1$ of the items with the automation level "1". It is noted that $N_N$ represents the number obtained by subtracting the number of items in which the number of applicable processes is 0 on all the lines inside the factory 41 from the number of items with the automation level "1". In the data illustrated in FIG. 10, the item "No. BB1" applies to the item in which the number of applicable processes is 0 on all the lines inside the factory 41. $N_N$ is calculated as 11 by subtracting 1 from 12 that is the number of items "No. BB1" to "No. BB12".

$$X_1=X_{BB1}+X_{BB2}+\ldots X_{BB12}/N_N \quad (9)$$

The scale determination unit 22 calculates the attainment levels $X_2$, $X_3$, and $X_4$ of the items with the automation levels "2", "3", and "4", respectively, in the same manner as the attainment level $X_1$ of the items with the automation level "1". Further, the scale determination unit 22 calculates the attainment level of the scale of a set utilizing IT for four management functions other than "BB management" for each automation level set for the items, in the same manner as "BB management".

FIG. 13 is a first diagram illustrating an example of determination results of the attainment level obtained by the automation determination unit 21 illustrated in FIG. 1 and the attainment level obtained by the scale determination unit 22 illustrated in FIG. 1. $Y_1$, $Y_2$, $Y_3$, and $Y_4$ illustrated in FIG. 13 represent calculation results of the attainment level obtained by the automation determination unit 21 for the automation levels "1", "2", "3", and "4" set for the items.

$X_1$, $X_2$, $X_3$, and $X_4$ illustrated in FIG. 13 represent calculation results of the attainment level obtained by the scale determination unit 22 for the automation levels "1", "2", "3", and "4" set for the items. FIG. 13 illustrates the calculation results $X_1$, $X_2$, $X_3$, and $X_4$ and $Y_1$, $Y_2$, $Y_3$, and $Y_4$ of the five management functions "AA management", "BB management", "CC management", "DD management", and "EE management".

FIG. 14 is a second diagram illustrating an example of determination results of the attainment level obtained by the automation determination unit 21 illustrated in FIG. 1 and the attainment level obtained by the scale determination unit 22 illustrated in FIG. 1. The automation determination unit 21 calculates Y that is the average value of the calculation results $Y_1$, $Y_2$, $Y_3$, and $Y_4$ of each individual management function by using the following equation (10). Due to this calculation, the automation determination unit 21 consolidates four points of determination results of the attainment level into one point.

$$Y = Y_1 + (Y_2 - 1) + (Y_3 - 2) + (Y_4 - 3) \quad (10)$$

The scale determination unit 22 calculates X that is the average value of the calculation results $X_1$, $X_2$, $X_3$, and $X_4$ of each individual management function by using the following equation (11). Due to this calculation, the scale determination unit 22 consolidates four points of determination results of the attainment level into one point.

$$X = (X_1 + X_2 + X_3 + X_4)/4 \quad (11)$$

FIG. 14 illustrates the calculation results X and Y of the five management functions "AA management", "BB management", "CC management", "DD management", and "EE management".

FIG. 15 is a diagram illustrating an example of display of the determination results obtained by the automation determination unit 21 and the scale determination unit 22 illustrated in FIG. 1. In the example illustrated in FIG. 15, the display unit 14 illustrated in FIG. 1 displays a graph showing the automation level determined by the automation determination unit 21 on the vertical axis and showing the scale level determined by the scale determination unit 22 on the horizontal axis. In the above graph, the display unit 14 displays points showing the determination results obtained by the automation determination unit 21 and the scale determination unit 22. In the example illustrated in FIG. 15, the display unit 14 shows, with a star-shaped mark, the determination results obtained by the automation determination unit 21 and the scale determination unit 22.

In the example illustrated in FIG. 15, the display unit 14 shows the calculation results X and Y of the five management functions in FIG. 14 consolidated into one point. The point illustrated in FIG. 15 indicates the average value of X and the average value of Y of the five management functions. The display unit 14 may display a point indicating the determination results of each management function. The display unit 14 may display a numerical value of the determination results illustrated in FIG. 14 along with the graph.

Further, the determination results presented by the IT utilization evaluation device 10 may include determination results of process management in a plurality of factories 41. Due to this presentation, a user can make a comparison of the degree of IT utilization in process management between the factories 41.

According to the first embodiment, the IT utilization evaluation device 10 determines the attainment level of the degree of IT-driven automation achieved and the attainment level of the scale of a set utilizing IT. The IT utilization evaluation device 10 can make evaluations of the achievement status of the IT-driven management automation and the expansion of the range where IT is used in management. Due to this operation, the IT utilization evaluation device 10 achieves an effect where it is possible to make useful and quantitative evaluations of the degree of IT utilization.

FIG. 16 is a diagram illustrating a modification of determination results of the attainment level obtained by the automation determination unit 21 illustrated in FIG. 1 and the attainment level obtained by the scale determination unit 22 illustrated in FIG. 1. In the modification illustrated in FIG. 16, the automation determination unit 21 calculates $Y_1$, $Y_2$, $Y_3$, and $Y_4$ having been adjusted by a weight coefficient set for each individual management function. $Y_1$, $Y_2$, $Y_3$, and $Y_4$ of each management function illustrated in FIG. 16 are calculated respectively by multiplying $Y_1$, $Y_2$, $Y_3$, and $Y_4$ of each management function illustrated in FIG. 13 by the weight coefficient. The scale determination unit 22 calculates $X_1$, $X_2$, $X_3$, and $X_4$ having been adjusted by a weight coefficient set for each individual management function. $X_1$, $X_2$, $X_3$, and $X_4$ of each management function illustrated in FIG. 16 are calculated respectively by multiplying $X_1$, $X_2$, $X_3$, and $X_4$ of each management function illustrated in FIG. 13 by the weight coefficient. As an example, the weight coefficient represents the importance of a management function.

Further, the automation determination unit 21 calculates $Y_1$, $Y_2$, $Y_3$, and $Y_4$ of the overall function of the five management functions. $Y_1$ of the overall function is a result obtained by summing $Y_1$ of the respective management functions and then dividing the sum of $Y_1$ by the sum of the weight coefficients. The automation determination unit 21 calculates $Y_2$, $Y_3$, and $Y_4$ of the overall function in the same manner as $Y_1$ of the overall function.

The scale determination unit 22 calculates $X_1$, $X_2$, $X_3$, and $X_4$ of the overall function of the five management functions. $X_1$ of the overall function is a result obtained by summing $X_1$ of the respective management functions and then dividing the sum of $X_1$ by the sum of the weight coefficients. The scale determination unit 22 calculates $X_2$, $X_3$, and $X_4$ of the overall function in the same manner as $X_1$ of the overall function.

It is also allowable in the modification that the automation determination unit 21 and the scale determination unit 22 consolidate four points of determination results of the attainment level into one point in the same manner as in FIG. 14. The display unit 14 may display a similar graph to FIG. 15. According to the modification, the IT utilization evaluation device 10 can adjust evaluations in such a manner that promoting IT utilization in a management function with a higher importance results in a higher evaluation.

A management target process that is a target to be evaluated by the IT utilization evaluation device 10 is not limited to the supply chain 40 in the manufacturing industry. The target to be evaluated by the IT utilization evaluation device 10 may be a management target process in plant operation management or building management.

Second Embodiment

Figure 17:
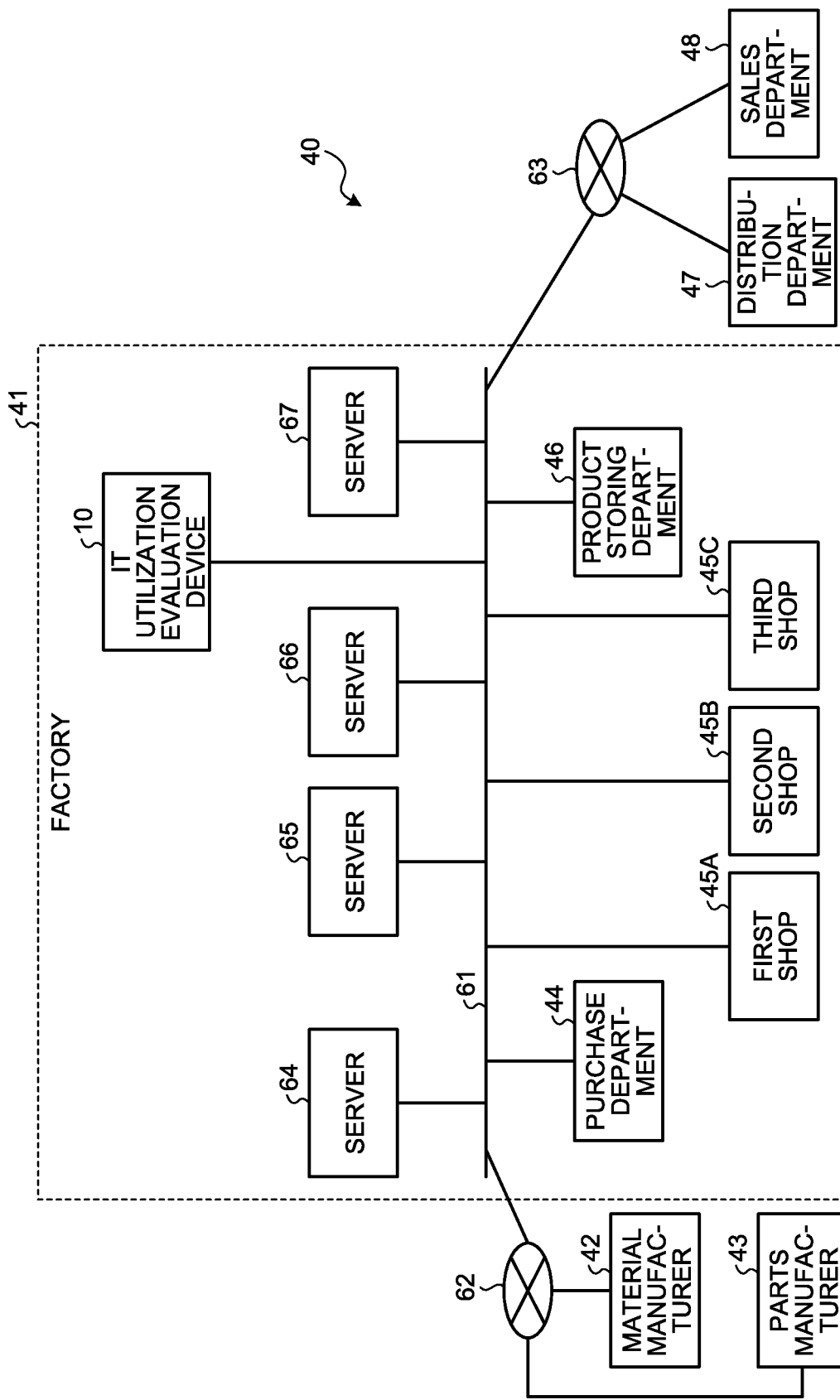
FIG. 17 is a diagram illustrating an example of a network system including an IT utilization evaluation device according to a second embodiment of the present invention.

FIG. 17 is a diagram illustrating an example of a network system including the IT utilization evaluation device 10 according to a second embodiment of the present invention. The IT utilization evaluation device 10 according to the second embodiment uses basic information and performance history information stored in a database to input information to the template 51 illustrated in FIG. 8, thereby enabling automation of the information input to the template 51. Parts identical to those of the first embodiment are denoted by like reference signs and redundant descriptions thereof will be omitted. The control unit 11 that is an information reference unit references basic information that is stored information regarding unit processes and performance history information that is stored information regarding unit processes and inputs the information to the template 51.

A network 61 is a communication network inside the factory 41. The network 61 connects the IT utilization evaluation device 10, the purchase department 44, the first shop 45A, the second shop 45B, the third shop 45C, and the product storing department 46 to each other. An example of the network 61 is a local area network (LAN). Further, servers 64, 65, 66, and 67 are connected to the network 61.

Networks 62 and 63 are communication networks outside the factory 41. The material manufacturer 42 and the parts manufacturer 43 are connected to the network 61 inside the factory 41 through the network 62. The distribution department 47 and the sales department 48 are connected to the network 61 inside the factory 41 through the network 63. The networks 62 and 63 are private networks that are allowed to handle confidential information. The Internet that is a wide area network may be used as the networks 62 and 63.

Figure 18:
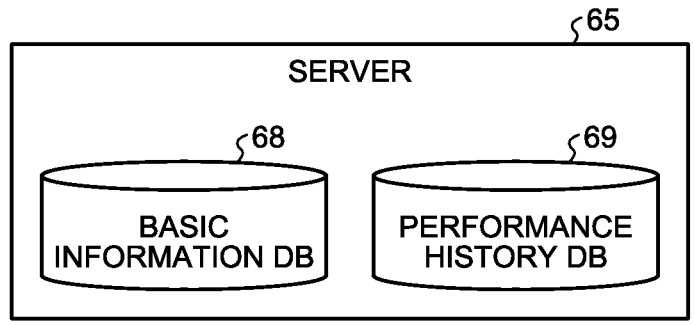
FIG. 18 is a diagram illustrating a database stored in a server illustrated in FIG. 17.

FIG. 18 is a diagram illustrating a database stored in the server 65 illustrated in FIG. 17. The server 65 has stored a basic information database (DB) 68 and a performance history DB 69. The basic information DB 68 is a database of the basic information regarding each unit process in the first shop 45A and the second shop 45B. The performance history DB 69 is a database of the performance history information regarding each unit process in the first shop 45A and the second shop 45B.

The server 66 illustrated in FIG. 17 has stored a basic information database and a performance history information database regarding each unit process in the third shop 45C. The server 64 has stored a basic information database and a performance history information database regarding each unit process in the material manufacturer 42, the parts manufacturer 43, and the purchase department 44. The server 67 has stored a basic information database and a performance history information database regarding each unit process in the product storing department 46, the distribution department 47, and the sales department 48. Any number of servers may be connected to the network 61 inside the factory 41. The server may be connected to the networks 62 and 63 outside the factory 41.

Figure 19:
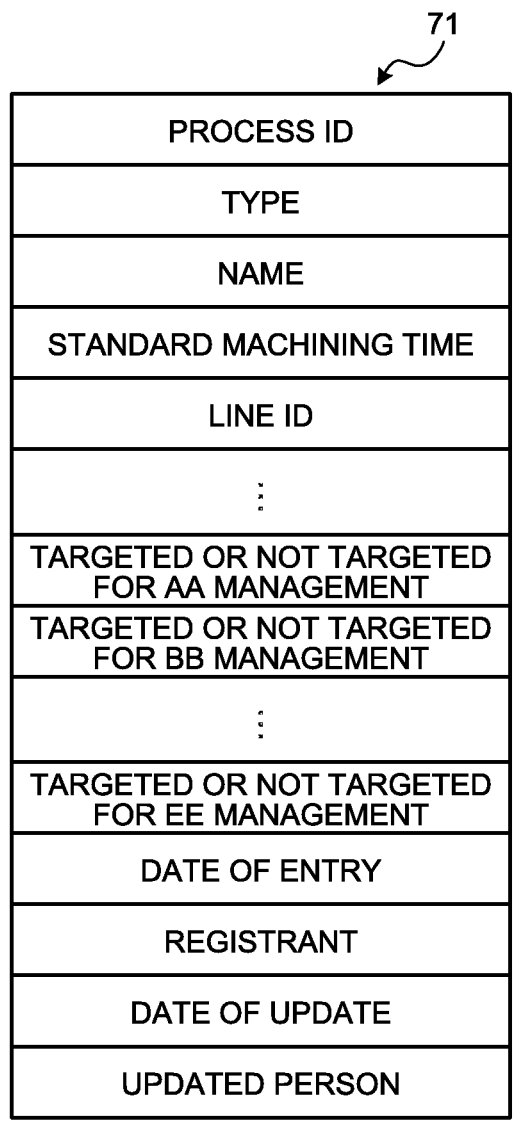
FIG. 19 is a diagram illustrating an example of basic information in a basic information DB illustrated in FIG. 18.

FIG. 19 is a diagram illustrating an example of basic information 71 in the basic information DB 68 illustrated in FIG. 18. In the basic information DB 68, the basic information 71 is entered on a unit process by unit process basis and collected. The basic information 71 includes a process ID with which a unit process can be uniquely identified, information on unit process type, facility name in the unit process, information on the standard machining time for the unit process, and a line ID representing a line including the unit process. The basic information 71 further includes information on the date of entry of the basic information 71 and a person who has entered the basic information 71, as well as information on the date of update of the basic information 71 and a person who has updated the basic information 71.

The basic information 71 further includes information indicating whether a unit process is targeted for IT introduction. The information indicating whether a unit process is targeted for IT introduction is entered in the basic information 71 on a management function by management function basis. The basic information 71 illustrated in FIG. 19 includes information indicating whether a unit process is targeted for IT introduction for five management functions, i.e., "AA management", "BB management", . . . , "EE management". A location for storing the information indicating whether a unit process is targeted for IT introduction may be set when the basic information DB 68 is constructed or may be additionally set in the existing basic information DB 68. The control unit 11 illustrated in FIG. 1 references the information indicating whether a unit process is targeted for IT introduction from the basic information 71 to determine the number of targets to be input to the template 51. The template creation unit 16 illustrated in FIG. 1 may create the template 51 in which information indicating a storage location is entered. The storage location shows where the information indicating whether a unit process is targeted for IT introduction is stored.

Figure 20:
FIG. 20 is a diagram illustrating an example of unprocessed data that is performance history information in a performance history DB illustrated in FIG. 18.

FIG. 20 is a diagram illustrating an example of unprocessed data that is performance history information in the performance history DB 69 illustrated in FIG. 18. Data 72A, 72B, and 72C that are unprocessed data are transaction data indicating the actual results of the test for product inspection. The data 72A, 72B, and 72C include a process ID, information on test start time and test end time, information on inspection device type, a product ID representing a target product for the inspection, and information on a determination of whether the product has passed the inspection. The data 72A, 72B, and 72C further include a first measurement value and a second measurement value that are raw data of the measurement results of the test.

The control unit 11 can determine from the data 72A, 72B, and 72C that a unit process with the process ID "KOUTEI-1" is applicable to the item "No. 2" that is "Is the facilities operation start time computerized?" illustrated in FIG. 8. It is allowable that the template creation unit 16 illustrated in FIG. 1 enters, in the template 51, the storage location of information indicating whether data is automatically collected. The control unit 11 references the entered storage-location information and thus can obtain information regarding an item for which the automation level "1" is set.

Figure 21:
FIG. 21 is a diagram illustrating an example of display data that is performance history information in the performance history DB illustrated in FIG. 18.

FIG. 21 is a diagram illustrating an example of display data that is performance history information in the performance history DB 69 illustrated in FIG. 18. In data 73A, 73B, and 73C that are display data, information on the actual results of a unit process for display purposes is added to the data 72A, 72B, and 72C illustrated in FIG. 20. As an example, facilities of the unit process display the display values included in the display data. A first display value is information obtained by processing the first measurement value for display purposes. A second display value is information obtained by processing the second measurement value for display purposes.

The control unit 11 can determine from the data 73A, 73B, and 73C that data is automatically visualized in a unit process with the process ID "KOUTEI-1". It is allowable that the template creation unit 16 enters, in the template 51, the storage location of information indicating whether data is automatically visualized. The control unit 11 references the entered storage-location information and thus can obtain information regarding an item for which the automation level "2" is set.

FIG. 22 is a diagram illustrating an example of processed data that is performance history information in the performance history DB 69 illustrated in FIG. 18. In data 74A, 74B, and 74C that are processed data, information on the actual results of a unit process, which has been processed for analysis purposes, is added to the data 73A, 73B, and 73C illustrated in FIG. 21. As an example, facilities of the unit process analyze and diagnose the actual results of the unit process. The average of the measurement values is information having been processed for analysis purposes.

The control unit 11 can determine from the data 74A, 74B, and 74C that data is analyzed and thereby diagnosed in a unit process with the process ID "KOUTEI-1". It is allowable that the template creation unit 16 illustrated in FIG. 1 enters, in the template 51, the storage location of information indicating whether data is automatically analyzed and thereby diagnosed. The control unit 11 references the entered storage-location information, and thus can obtain information regarding an item for which the automation level "3" is set.

FIG. 23 is a diagram illustrating an example of instruction data that is performance history information in the performance history DB 69 illustrated in FIG. 18. Data 75A, 75B, and 75C that are instruction data include a product ID and detailed instruction information. As an example, facilities of a unit process issue instructions included in the instruction data so as to control the unit process itself or other unit processes in accordance with the diagnostic results. The data 75A includes instructions to permit shipment of a product with the product ID "AAA001". The data 75B includes instructions to discard a product with the product ID "AAA002" due to its fault. The data 75C includes instructions to reinspect a product with the product ID "AAA003".

The control unit 11 can determine from the data 75A, 75B, and 75C and from the data 74A, 74B, and 74C in FIG. 22 that a unit process with the process ID "KOUTEI-1" is controlled in accordance with the diagnostic results. It is allowable that the template creation unit 16 illustrated in FIG. 1 enters, in the template 51, the storage location of information indicating whether the unit process is automatically controlled in accordance with the diagnostic results. The control unit 11 references the entered storage-location information and thus can obtain information regarding an item for which the automation level "4" is set.

FIG. 24 is a flowchart illustrating an operational procedure for the IT utilization evaluation device 10 according to the second embodiment. Steps S1 to S3 in the procedure illustrated in FIG. 24 are the same as Steps S1 to S3 illustrated in FIG. 6. After preparation of the template 51 is completed in accordance with the procedure at Steps S1 to S3, the IT utilization evaluation device 10 makes evaluations in accordance with the procedure at Step S31 and the subsequent steps.

At Step S31, the control unit 11 references the basic information and the performance history information, and inputs the number of targets and the number of applicable processes to the template 51. The number of targets and the number of applicable processes may be input to the template 51 by using the basic information and the performance history information in combination with an input from the input unit 13 by a user. It is allowable that the IT utilization evaluation device 10 obtains information through an input by a user when the information cannot be obtained from the basic information and the performance history information. Steps S6 and S7 after Step S31 are the same as Steps S6 and S7 illustrated in FIG. 6.

According to the second embodiment, the IT utilization evaluation device 10 uses basic information and performance history information stored in a database to input necessary information to the template 51. Due to this operation, the IT utilization evaluation device 10 is capable of reducing the burden on a user in inputting information to the template 51 and thus can make evaluations more easily and in a shorter time. In the second embodiment, the IT utilization evaluation device 10 may calculate the attainment level adjusted by a weight coefficient in the same manner as in the modification of the first embodiment.

Third Embodiment

Figure 25:
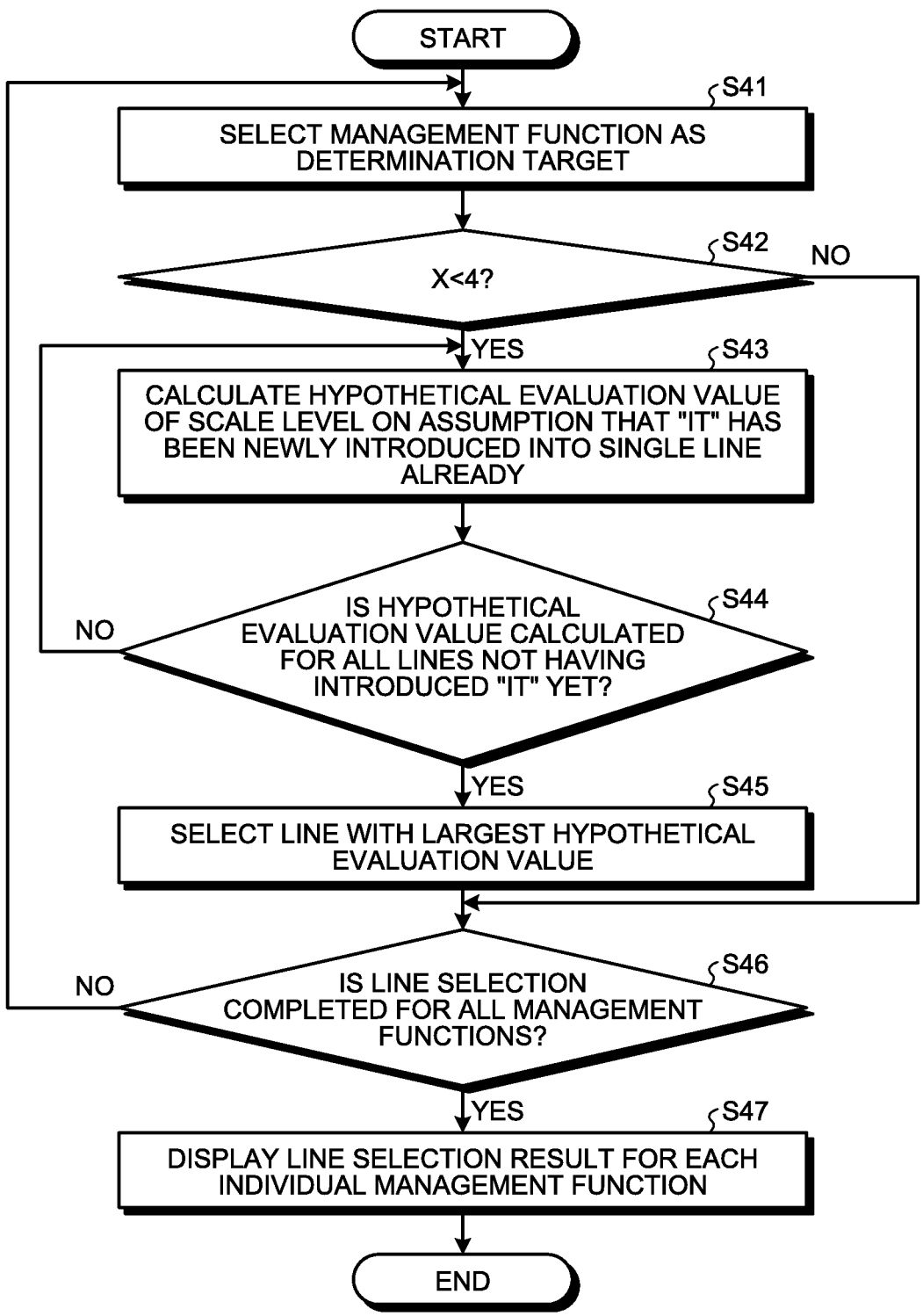
FIG. 25 is a flowchart illustrating an operational procedure for an IT utilization evaluation device according to a third embodiment of the present invention.

FIG. 25 is a flowchart illustrating an operational procedure for the IT utilization evaluation device 10 according to a third embodiment of the present invention. The IT utilization evaluation device 10 according to the third embodiment selects a target line or a target unit process for promoting IT utilization. Parts identical to those of the first embodiment are denoted by like reference signs and redundant descriptions thereof will be omitted. On the assumption that IT has been newly introduced into a line or a unit process, the scale determination unit 22 calculates a hypothetical evaluation value that is the scale level, and on the basis of the hypothetical evaluation value, the scale determination unit 22 selects a target line or a target unit process for promoting IT introduction. The procedure illustrated in FIG. 25 is a procedure for selecting a target line for promoting IT utilization for each individual management function.

At Step S41, the scale determination unit 22 illustrated in FIG. 1 selects a single management function as a determination target. At Step S42, the scale determination unit 22 determines whether the attainment level X of the management function selected at Step S41 is lower than four, where the attainment level X is calculated on the basis of the number of targets and the number of applicable processes input to the template 51. When the attainment level X is four (NO at Step S42), the scale determination unit 22 determines not to select a target line for promoting IT utilization for the selected management function. The scale determination unit 22 advances the procedure to Step S46 described later.

When the attainment level X is lower than four (YES at Step S42), the scale determination unit 22 calculates a hypothetical evaluation value of the scale level for a single line at Step S43 on the assumption that IT has been newly introduced into the single line already. At Step S44, the scale determination unit 22 determines whether a hypothetical evaluation value is calculated for all the lines not having introduced IT yet. When there is a line not having introduced IT yet and a hypothetical evaluation value of this line is not calculated (NO at Step S44), the scale determination unit 22 returns the procedure to Step S43 to calculate a hypothetical evaluation value for this line.

When a hypothetical evaluation value is calculated for all the lines not having introduced IT yet (YES at Step S44), the scale determination unit 22 selects a line with the largest hypothetical evaluation value at Step S45. Next, at Step S46, the scale determination unit 22 determines whether line selection is completed for all the management functions. When there is a management function for which line selection is not completed (NO at Step S46), the scale determination unit 22 repeats the procedure from Step S41 at which a management function is selected.

When line selection is completed for all the management functions (YES at Step S46), the IT utilization evaluation device 10 displays the line selection result for each individual management function on the display unit 14 illustrated in FIG. 1 at Step S47. The IT utilization evaluation device 10 then ends the operational procedure illustrated in FIG. 25.

It is allowable that the IT utilization evaluation device 10 selects a target unit process for promoting IT utilization instead of selecting a target line. In this case, the scale determination unit 22 calculates a hypothetical evaluation value obtained when one is added to the number of applicable processes for each item of the template 51 and selects a unit process with the largest hypothetical evaluation value.

According to the third embodiment, the IT utilization evaluation device 10 selects a target line or a target unit process for promoting IT utilization on the basis of a hypothetical evaluation value. Due to this selection, the IT utilization evaluation device 10 can present to a user a target for which IT utilization can be effectively promoted. In the third embodiment, the IT utilization evaluation device 10 may calculate the attainment level adjusted by a weight coefficient in the same manner as in the modification of the first embodiment. In the third embodiment, it is also possible that the IT utilization evaluation device 10 uses basic information and performance history information stored in a database to input necessary information to a template in the same manner as in the second embodiment.

The configurations described in the above embodiments are only examples of an aspect of the present invention. The configurations can be combined with other well-known techniques, and part of each of the configurations can be omitted or modified without departing from the scope of the present invention.

REFERENCE SIGNS LIST

10 IT utilization evaluation device, 11 control unit, 12 storage unit, 13 input unit, 14 display unit, communication unit, 16 template creation unit, 17 computation unit, 18 template storage unit, 21 automation determination unit, 22 scale determination unit, 31 CPU, 32 RAM, 33 ROM, 34 external storage device, 35 communication I/F, 36 input device, 37 display, 38 bus, supply chain, 41 factory, 42 material manufacturer, parts manufacturer, 44 purchase department, 45A first shop, 45B second shop, 45C third shop, 46 product storing department, 47 distribution department, 48 sales department, 50 input format, 51 template, 61, 62, 63 network, 64, 65, 66, 67 server, 68 basic information DB, performance history DB, 71 basic information, 72A, 72B, 72C, 73A, 73B, 73C, 74A, 74B, 74C, 75A, 75B, 75C data.

The invention claimed is:

1. An information-technology utilization evaluation device to evaluate a degree of utilization of information technology in a management target process that includes a plurality of work processes each including at least one production line, the device comprising processing circuitry configured as:
   a first determiner to determine a first attainment level representing a degree of automation achieved by utilizing the information technology in each production line of the management target process, each of the at least one production line including at least one unit process, one or more items being defined for each of the at least one production line, each item corresponding to a distinct aspect of the production line for which a corresponding automation level and a corresponding number of applicable processes can be indicated, the number of applicable processes representing a number of unit processes in the corresponding production line into which information technology has already been introduced; and
   a second determiner to determine a second attainment level representing a scale of utilizing the information technology in each production line of the management target process, wherein
   the first determiner determines the first attainment level by quantifying a degree of the automation achieved on a basis of a number of the one or more in each of the at least one production line for which the corresponding number of applicable processes is equal to or greater than one, and
   the second determiner determines the second attainment level by quantifying the scale of utilizing the information technology based on evaluating at least one condition with respect to the number of applicable processes and a number of targets on each of the at least one production line in each of the plurality of work processes, the number of targets being a number of the at least one unit processes targeted for introduction of the information technology.

2. The information-technology utilization evaluation device according to claim 1, comprising a display to present the first attainment level and the second attainment level.

3. The information-technology utilization evaluation device according to claim 1, comprising a template creator to create a template to which information regarding the automation in the unit process is input, wherein
   the first determiner determines the first attainment level on a basis of the information input to the template, and
   the second determiner determines the second attainment level on a basis of the information input, to the template.

4. The information-technology utilization evaluation device according to claim 3, wherein
   the template includes a field for inputting the number of targets that is the information regarding a first set that is a set constituted by an array of the unit processes and a field for inputting the number of applicable processes that is the information regarding the first set,
   the first determiner determines the first attainment level on a basis of the number of targets and the number of applicable processes input to the template, and
   the second determiner determines the second attainment level on a basis of the number of targets and the number of applicable processes input to the template.

5. The information-technology utilization evaluation device according to claim 4, wherein
   the template includes the field for inputting the number of targets and the field for inputting the number of applicable processes for each of the items for a management function using the information technology,
   the first determiner determines the first attainment level on a basis of the number of targets and the number of applicable processes for each of the items, and
   the second determiner determines the second attainment level on a basis of the number of targets and the number of applicable processes for each of the items.

6. The information-technology utilization evaluation device according to claim 3, comprising a receiver to receive an input of the information to the template.

7. The information-technology utilization evaluation device according to claim 3, comprising a referenced information transmitter to reference stored information regarding the unit process and to input the information to the template.

8. The information-technology utilization evaluation device according to claim 1, wherein the first determiner calculates the first attainment level adjusted by a weight coefficient set for each management function using the information technology, and the second determiner calculates the second attainment level adjusted by a weight coefficient set for each management function using the information technology.

9. The information-technology utilization evaluation device according to claim 1, wherein the second determiner calculates a hypothetical evaluation value that is the second attainment level on an assumption that the information technology is newly introduced into the set or the unit process and selects the set or the unit process with a largest value of the hypothetical evaluation value.

10. The information-technology utilization evaluation device according to claim 1, wherein a plurality of stage levels that are quantification criteria for the first attainment level are defined in advance, and the items are set for each of the stage levels, and the first determiner quantifies a degree of the automation achieved for each of the stage levels on a basis of number of the items with the number of applicable processes being equal to or greater than one for each of the stage levels, and consolidates quantification results for the stage levels to calculate a value of the first attainment level.

11. The information-technology utilization evaluation device according to claim 1, wherein a plurality of stage levels that are quantification criteria for the first attainment level are defined in advance, and the items are set for each of the stage levels, and the second determiner quantifies a scale of a set utilizing the information technology for each of the stage levels, and consolidates quantification results for the stage levels to determine a value of the second attainment level.

12. The information-technology utilization evaluation device according to claim 1, wherein a plurality of stage levels that are quantification criteria for the second attainment level are defined in advance, and the condition includes a condition set for each of the stage levels.

13. The information-technology utilization evaluation device according to claim 12, wherein the second determiner is capable of calculating a value of the second attainment level that is a value intermediate between the stage levels.

14. The information-technology utilization evaluation device according to claim 1, wherein the first determiner determines the first attainment level representing the degree of automation achieved for each item as a ratio between the number of applicable processes and a number of targets that is a number of unit processes that are targeted for introduction of the information technology.

15. The information-technology utilization evaluation device according to claim 1, wherein the at least one condition includes whether the number of applicable processes on all lines in a factory is zero.

16. The information-technology utilization evaluation device according to claim 1, wherein the at least one condition includes whether there is a line in the at least one line of the plurality of work processes with the number of applicable processes being equal to the number of targets in a factory.

17. The information-technology utilization evaluation device according to claim 1, wherein the at least one condition includes whether the number of applicable processes equals one on one line in the at least one line of the plurality of work processes, and the number of applicable processes equals zero on all other lines in the at least one line of the plurality of work processes.

18. The information-technology utilization evaluation device according to claim 1, wherein the at least one condition includes whether there is a line with the number of applicable processes being equal to the number of targets in a factory.

19. The information-technology utilization evaluation device according to claim 1, wherein the at least one condition includes whether there the number of applicable processes is zero on all lines in a factory except for one line in the factory.

20. The information-technology utilization evaluation device according to claim 1, wherein the plurality of work processes includes work processes performed in a factory and work processes performed outside the factory, and the at least one condition includes whether the number of applicable processes is zero on all lines performed outside the factory.

21. An information-technology utilization evaluation method for causing a computer to evaluate a degree of utilization of information technology in a management target process that that includes a plurality of work processes each including at least one production line, the method comprising:

determining a first attainment level representing a degree of automation achieved by utilizing the information technology in each production line of the management target process, each of the at least one production line including at least one unit process, one or more items being defined for each of the at least one production line, each item corresponding to a distinct aspect of the production line for which a corresponding automation level and a corresponding number of applicable processes can be indicated, the number of applicable processes representing a number of unit processes in the corresponding production line into which information technology has already been introduced; and determining a second attainment level representing a scale of utilizing the information technology in each production line of the management target process, wherein the first attainment level is determined by quantifying a degree of the automation achieved on a basis of a number of the one or more items in each of the at least one production line for which the corresponding number of applicable processes is equal to or greater than one, and the second attainment level is determined by quantifying the scale of a set utilizing the information technology based on evaluating at least one condition with respect to the number of applicable processes and a number of targets on each of the at least one production line in each of the plurality of work processes, the number of targets being a number of the at least one unit processes targeted for introduction of the information technology.

* * * * *